(12) United States Patent
Miyagishima

(10) Patent No.: US 12,449,643 B2
(45) Date of Patent: Oct. 21, 2025

(54) IMAGING LENS AND IMAGING APPARATUS

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 18/408,373

(22) Filed: Jan. 9, 2024

(65) Prior Publication Data

US 2024/0151951 A1    May 9, 2024

Related U.S. Application Data

(63) Continuation of application No. 17/150,097, filed on Jan. 15, 2021, now Pat. No. 11,906,715.

(30) Foreign Application Priority Data

Jan. 29, 2020   (JP) ................................ 2020-012968

(51) Int. Cl.
  *G02B 15/14*      (2006.01)
  *G02B 15/20*      (2006.01)
  *G02B 27/00*      (2006.01)

(52) U.S. Cl.
  CPC ..... *G02B 15/143505* (2019.08); *G02B 15/20* (2013.01); *G02B 27/0025* (2013.01)

(58) Field of Classification Search
  CPC ............ G02B 15/143505; G02B 15/20; G02B 27/0025

(Continued)

(56) References Cited

U.S. PATENT DOCUMENTS

2011/0043664 A1    2/2011   Mihara
2012/0081791 A1    4/2012   Tanaka et al.

(Continued)

FOREIGN PATENT DOCUMENTS

CN         102016685 A     4/2011
JP          H02-136811 A    5/1990

(Continued)

OTHER PUBLICATIONS

An Office Action; "Notice of Reasons for Refusal," mailed by the Japanese Patent Office on Oct. 4, 2022, which corresponds to Japanese Patent Application No. 2020-012968 and is related to U.S. Appl. No. 17/150,097; with English language translation.

(Continued)

*Primary Examiner* — Sharrief I Broome
(74) *Attorney, Agent, or Firm* — Studebaker Brackett PLLC

(57) ABSTRACT

An imaging lens consisting of, in order from an object side to an image side: a first lens group; a second lens group that has a positive refractive power; and a third lens group that has a negative refractive power, wherein the first lens group includes, successively in order from a position closest to the object side to the image side, two negative lenses and a positive lens, the second lens group includes a positive lens and a negative lens, during focusing from an object at infinity to a closest object, the first lens group remains stationary with respect to an image plane, and the second lens group moves along an optical axis, and assuming that a focal length of the first lens group is f1, and a focal length of the second lens group is f2, Conditional Expression (1) is satisfied: $-0.5 < f2/f1 < 0.5$   (1).

20 Claims, 16 Drawing Sheets

(58) Field of Classification Search
USPC .......................................................... 359/683
See application file for complete search history.

(56) References Cited

U.S. PATENT DOCUMENTS

| | | | | |
|---|---|---|---|---|
| 2013/0162886 | A1* | 6/2013 | Morooka ....... | G02B 15/143107 359/684 |
| 2014/0184882 | A1* | 7/2014 | Kuzuhara ................ | G02B 7/14 359/739 |
| 2014/0368926 | A1* | 12/2014 | Suzuki ................. | G02B 13/006 359/708 |
| 2015/0268449 | A1 | 9/2015 | Kurioka et al. | |
| 2015/0309393 | A1* | 10/2015 | Kuzuhara ...... | G02B 15/143503 348/360 |
| 2019/0079305 | A1* | 3/2019 | Ichimura ................ | G02B 27/16 |
| 2020/0333569 | A1 | 10/2020 | Kondo | |
| 2020/0341248 | A1 | 10/2020 | Iwamoto | |
| 2021/0181462 | A1* | 6/2021 | Hatada ................ | G02B 27/0025 |

FOREIGN PATENT DOCUMENTS

| | | |
|---|---|---|
| JP | 2009-145589 A | 7/2009 |
| JP | 2010-271669 A | 12/2010 |
| JP | 2012-078550 A | 4/2012 |
| JP | 2013-029658 A | 2/2013 |
| JP | 2013-125213 A | 6/2013 |
| JP | 2014-142604 A | 8/2014 |
| JP | 2015-001641 A | 1/2015 |
| JP | 2015-075501 A | 4/2015 |
| JP | 2015-194714 A | 11/2015 |
| JP | 2017-156431 A | 9/2017 |
| JP | 2017-156432 A | 9/2017 |
| JP | 2018-146607 A | 9/2018 |
| JP | 2020-181071 A | 11/2020 |
| JP | 2021-092694 A | 6/2021 |

OTHER PUBLICATIONS

An Office Action; "Notice of Reasons for Refusal," mailed by the Japanese Patent Office on Jan. 17, 2023, which corresponds to Japanese Patent Application No. 2020-012968 and is related to U.S. Appl. No. 17/150,097; with English language translation.

An Office Action; mailed by the China National Intellectual Property Administration of the People's Republic of China on Jul. 9, 2025, which corresponds to Chinese Patent Application No. 202110114372.7 and is related to U.S. Appl. No. 18/408,373.

* cited by examiner

IMAGING LENS AND IMAGING APPARATUS

CROSS-REFERENCE TO RELATED APPLICATIONS

The present application is a Continuation of U.S. patent application Ser. No. 17/150,097, filed on Jan. 15, 2021, which claims priority under 35 U.S.C. § 119 to Japanese Patent Application No. 2020-012968, filed on Jan. 29, 2020. The above application is hereby expressly incorporated by reference, in its entirety, into the present application.

BACKGROUND

Technical Field

The present disclosure relates to an imaging lens and an imaging apparatus.

Related Art

Conventionally, as imaging lenses, the lens systems described in JP2018-146607A and JP2017-156431A are known.

In recent years, there has been a demand for a wide-angle imaging lens that has a small size and has favorable optical performance.

SUMMARY

The present disclosure has been made in view of the above circumstances, and an object of the present disclosure is to provide a wide-angle imaging lens having a small size and favorable optical performance, and an imaging apparatus including the imaging lens.

The imaging lens according to an aspect of the present disclosure consists of, in order from an object side to an image side: a first lens group; a second lens group that has a positive refractive power; and a third lens group that has a negative refractive power. The first lens group includes, successively in order from a position closest to the object side to the image side, two negative lenses and a positive lens, the second lens group includes a positive lens and a negative lens, during focusing from an object at infinity to a closest object, the first lens group remains stationary with respect to an image plane, and the second lens group moves along an optical axis, and assuming that a focal length of the first lens group is f1, and a focal length of the second lens group is f2, Conditional Expression (1) is satisfied.

$$-0.5 < f2/f1 < 0.5 \tag{1}$$

In the imaging lens according to the aspect of the present disclosure, assuming that a focal length of the third lens group is f3, it is preferable to satisfy Conditional Expression (2).

$$1 < |f3/f2| < 3 \tag{2}$$

Further, in the imaging lens according to the aspect of the present disclosure, assuming that a distance on the optical axis from a lens surface closest to the object side to a lens surface closest to the image side in a state where the object at infinity is in focus is TTL, it is preferable to satisfy Conditional Expression (3).

$$-0.1 < TTL/f1 < 0.55 \tag{3}$$

Further, in the imaging lens according to the aspect of the present disclosure, assuming that a focal length of the imaging lens in a state where the object at infinity is in focus is fA, it is preferable to satisfy Conditional Expression (4).

$$-0.1 < fA/f1 < 0.2 \tag{4}$$

Further, in the imaging lens according to the aspect of the present disclosure, it is preferable that the first lens group includes, successively in order from the position closest to the object side to the image side, a negative lens convex toward the object side, a biconcave lens, and plural single lenses each having a positive refractive power, and a lens surface closest to the image side in the first lens group is a convex surface.

In addition, in the imaging lens according to the aspect of the present disclosure, it is preferable that the second lens group includes a cemented lens which is formed by cementing a negative lens and a positive lens, and a single lens which is disposed closer to the image side than the cemented lens and which has a positive refractive power.

In the imaging lens according to the aspect of the present disclosure, it is preferable that the second lens group includes plural cemented lenses each of which is formed by cementing a negative lens and a positive lens, and a single lens which has a positive refractive power.

Further, in the imaging lens according to the aspect of the present disclosure, it is preferable that the second lens group includes a stop.

Moreover, in the imaging lens according to the aspect of the present disclosure, it is preferable that the third lens group includes a positive lens and a negative lens.

In addition, in the imaging lens according to the aspect of the present disclosure, assuming that a focal length of the third lens group is f3, it is preferable to satisfy Conditional Expression (5).

$$-1 < f3/f1 < 0.5 \tag{5}$$

Further, in the imaging lens according to the aspect of the present disclosure, it is preferable that a refractive index of a lens closest to the object side at a d line is 1.7 or more, and an Abbe number of a lens, which is second from the object side, based on the d line is 60 or more.

In the imaging lens according to the aspect of the present disclosure, assuming that an average value of Abbe numbers of a lens closest to the object side and a lens, which is second from the object side, based on a d line is v12, and an Abbe number of a lens, which is third from the object side, based on the d line is v3, it is preferable to satisfy Conditional Expression (6).

$$25 < v12 - v3 < 45 \tag{6}$$

Further, in the imaging lens according to the aspect of the present disclosure, assuming that a lateral magnification of the second lens group in a state where the object at infinity is in focus is β2, and a lateral magnification of the third lens group in a state where the object at infinity is in focus is β3, it is preferable to satisfy Conditional Expression (7).

$$1.5 < (1-(\beta2^2) \times \beta3^2 < 2.5 \tag{7}$$

In the imaging lens according to the aspect of the present disclosure, assuming that a lateral magnification of the third lens group in a state where the object at infinity is in focus is β3, it is preferable to satisfy Conditional Expression (8).

$$1.4 < \beta3 < 1.55 \tag{8}$$

Further, in the imaging lens according to the aspect of the present disclosure, assuming that a radius of curvature of an object side surface of a lens closest to the object side is R11, and a radius of curvature of an image side surface of the lens closest to the object side is R12, it is preferable to satisfy Conditional Expression (9).

$$-1<(R12-R11)/(R12+R11)<-0.5 \quad (9)$$

In the imaging lens according to the aspect of the present disclosure, assuming that a radius of curvature of an object side surface of a lens which is second from the object side is R21, and a radius of curvature of an image side surface of the lens which is second from the object side is R22, it is preferable to satisfy Conditional Expression (10).

$$-1.5<(R22+R21)/(R22-R21)<0.1 \quad (10)$$

Further, in the imaging lens according to the aspect of the present disclosure, it is preferable that the second lens group includes a stop, and has lenses adjacent to the object side and the image side of the stop. Assuming that a radius of curvature of an image side surface of the lens adjacent to the object side of the stop is Rstf, and a radius of curvature of an object side surface of the lens adjacent to the image side of the stop is Rstr, it is preferable to satisfy Conditional Expression (11).

$$-1<(Rstr-Rstf)/(Rstr+Rstf)<-0.3 \quad (11)$$

Further, in the imaging lens according to the aspect of the present disclosure, it is preferable that the second lens group includes a stop, and has lenses on the object side and the image side of the stop, and assuming that a combined focal length of all lenses closer to the object side than the stop in the second lens group is f2f, and a combined focal length of all lenses closer to the image side than the stop in the second lens group is f2r, it is preferable to satisfy Conditional Expression (12).

$$0<f2f/f2r<2.5 \quad (12)$$

Further, in the imaging lens according to the aspect of the present disclosure, in a case where one lens component is one single lens or one cemented lens, assuming that a distance on the optical axis from a surface closest to the image side in a lens component which is second from the image side in the second lens group to a surface closest to the object side in a lens component closest to the image side in the second lens group is dd, and a distance on the optical axis from a lens surface closest to the object side in the second lens group to a lens surface closest to the image side in the second lens group is TTL2, it is preferable to satisfy Conditional Expression (13).

$$0.09<dd/TTL2<0.17 \quad (13)$$

An imaging apparatus according to another aspect of the present disclosure includes the imaging lens according to the aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "group having a positive refractive power" means that the entire group has a positive refractive power, and the term "group having a negative refractive power" means that the entire group has a negative refractive power. The "lens having a positive refractive power" and the "positive lens" are synonymous, and the "lens having a negative refractive power" and the "negative lens" are synonymous.

The term "a single lens" means one lens that is not cemented. However, a compound aspheric lens (a lens which is integrally composed of a spherical lens and a film having an aspheric shape formed on the spherical lens, and functions as one aspheric lens as a whole) is not be considered as a cemented lens, and is treated as a single lens. Regarding a lens including an aspherical surface, unless otherwise specified, the sign of the refractive power, the radius of curvature of the lens surface and the surface shape of the lens surface are considered in the paraxial region. The sign of the radius of curvature of the surface convex toward the object side is positive and the sign of the radius of curvature of the surface convex toward the image side is negative.

The "focal length" used in a conditional expression is a paraxial focal length. The values used in conditional expressions are values in the case of using the d line as a reference in a state where the object at infinity is in focus. The "d line", "C line", and "F line" described in the present specification are emission lines. The wavelength of the d line is 587.56 nm (nanometers) and the wavelength of the C line is 656.27 nm (nanometers), and the wavelength of F line is 486.13 nm (nanometers).

According to the present disclosure, it is possible to provide a wide-angle imaging lens having a small size and favorable optical performance, and an imaging apparatus including the imaging lens.

DESCRIPTION OF EMBODIMENTS

Figure 1:
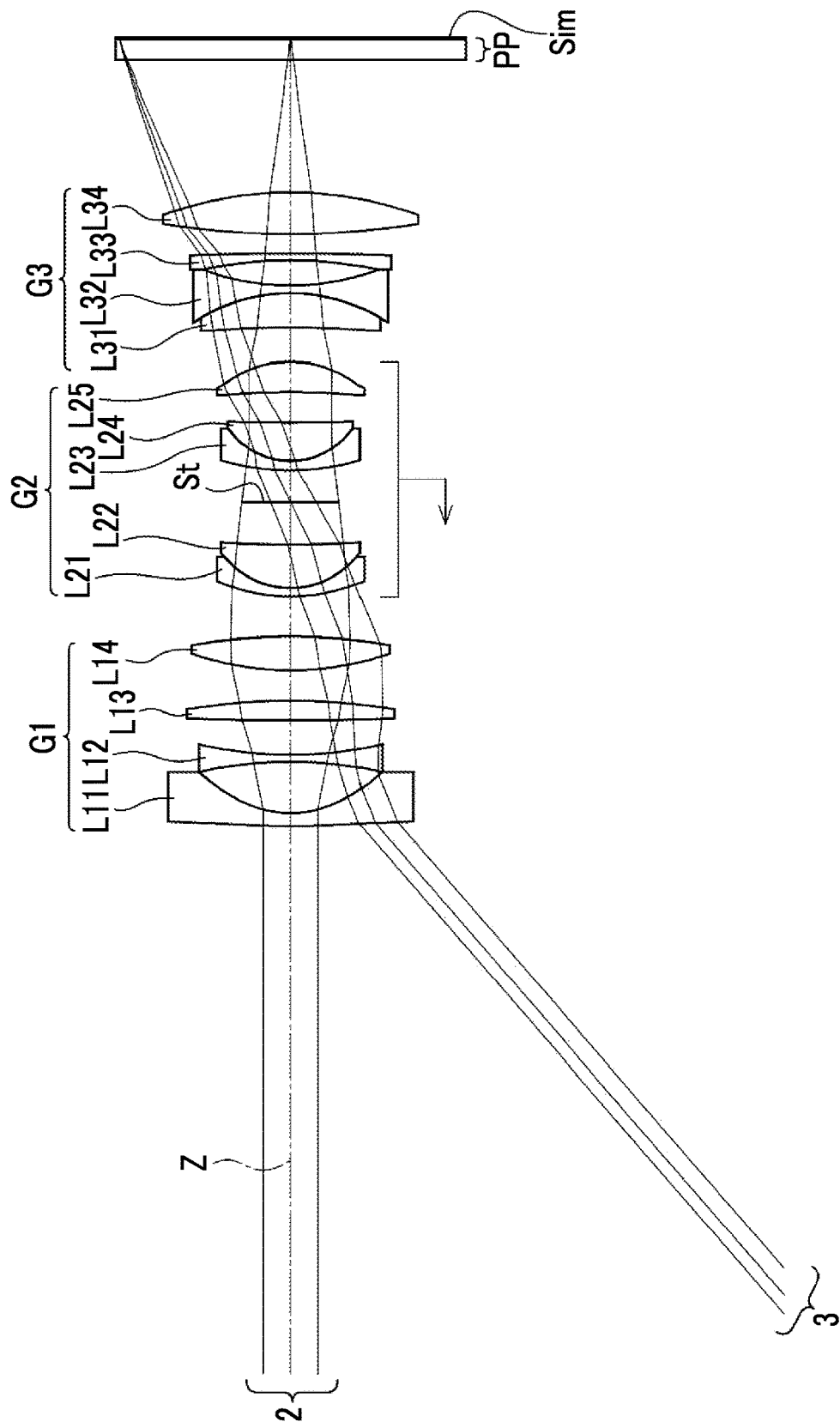
FIG. 1 is a cross-sectional view showing a configuration and optical paths of an imaging lens (an imaging lens of Example 1) according to an embodiment.

Hereinafter, embodiments of the present disclosure will be described in detail with reference to the accompanying drawings. FIG. 1 is a diagram showing a configuration and optical paths in a cross section including an optical axis Z of an imaging lens according to an embodiment of the present disclosure, and corresponds to a lens configuration of Example 1 described later. FIG. 1 shows a state in which the object at infinity is in focus, where the left side is the object side and the right side is the image side. Further, FIG. 1 also shows, as the rays, on-axis rays 2 and rays with the maximum angle of view 3.

It should be noted that FIG. 1 shows an example in which an optical member PP having a parallel plate shape is disposed between an imaging lens and an image plane Sim under assumption that the imaging lens is applied to the imaging apparatus. The optical member PP is a member assumed to include various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure consists of, in order from the object side to the image side along the optical axis Z, a first lens group G1, a second lens group G2 having a positive refractive power, and a third lens group G3 having a negative refractive power. As an example, in the imaging lens shown in FIG. 1, the first lens group G1 consists of four lenses L11 to L14 in order from the object side to the image side. The second lens group G2 consists of five lenses L21 to L25 in order from the object side to the image side. The third lens group G3 consists of four lenses L31 to L34 in order from the object side to the image side.

In the imaging lens of the present disclosure, during focusing from the object at infinity to the closest object, the first lens group G1 remains stationary with respect to the image plane Sim, and the second lens group G2 moves along the optical axis Z. FIG. 1 shows an example in which the second lens group G2 moves to the object side during focusing from the object at infinity to the closest object. The arrow pointing to the left under the second lens group G2 shown in FIG. 1 indicates that the second lens group G2 is a focus group which moves to the object side during focusing from the object at infinity to the closest object. Hereinafter, the lens group that moves during focusing is referred to as a "focus group".

In addition, the third lens group G3 may be formed to move together with the second lens group G2 during focusing. By using the second lens group G2 or the second lens group G2 and the third lens group G3 as the focus group, the size and the weight of the focus group can be reduced as compared with a lens system that performs focusing by moving the entire imaging lens. Therefore, it is possible to reduce the size and weight of the focusing unit including the focus group and the mechanical parts associated with the focus group. Thus, there is an advantage in reducing the load on the driving system, which is for driving the focus group, and increasing the focusing speed.

In the imaging lens of the present disclosure, the first lens group G1 includes, successively in order from the position closest to the object side to the image side, two negative lenses and a positive lens. As an example, the first lens group G1 shown in FIG. 1 consists of, in order from the object side to the image side, a negative lens L11, a negative lens L12, a positive lens L13, and a positive lens L14. Since the first lens group G1 is configured to include two negative lenses, the size of the lens system can be reduced in the radial direction. Since the first lens group G1 includes one negative lens and one positive lens, it becomes easy to correct chromatic aberration and distortion, and it is possible to suppress fluctuation in chromatic aberration caused by movement of the focus group during focusing. By disposing the negative lens at the position closest to the object side in the first lens group G1, there is an advantage in achieving an increase in angle of view. By setting the lens arrangement of the first lens group G1 in which the negative lens and the positive lens are arranged in order from the position closest to the object side, there is an advantage in improving the sagittal coma aberration.

It is preferable that the first lens group G1 includes, in order from the object side to the image side, a negative lens convex toward the object side, a biconcave lens, and plural single lenses having a positive refractive power. By forming the lens closest to the object side as a negative lens convex toward the object side, there is an advantage in suppressing distortion. The biconcave lens is able to reduce the angle of the off-axis rays with respect to the optical axis Z. Thus, there is an advantage in suppressing change in angle of view (bleeding) during the focusing operation. Further, since the width of the rays can be widened by the biconcave lens, there is an advantage in suppressing sagittal coma aberration. Since the first lens group G1 includes plural single lenses having a positive refractive power, a positive refractive power of the first lens group G1 can be strengthened. Thus, there is an advantage in reducing the size of the imaging lens in the optical axis direction.

Further, it is preferable that the lens surface closest to the image side in the first lens group is a convex surface. By forming the lens surface closest to the image side in the first lens group G1 as a convex surface, there is an advantage in correcting distortion and astigmatism.

Further, it is preferable that the lens closest to the object side in the first lens group G1 is an aspherical lens. By forming the lens closest to the object side in the first lens group G1 as an aspherical lens, there is an advantage in correcting distortion, astigmatism, and coma aberration.

It is preferable that the first lens group G1 has a positive refractive power as a whole. Since the first lens group G1 has a positive refractive power, there is an advantage in shortening the total length of the lens system.

In the imaging lens of the present disclosure, the second lens group G2 includes a positive lens and a negative lens. For example, the second lens group G2 shown in FIG. 1 consists of, in order from the object side to the image side, a negative lens L11, a positive lens L22, an aperture stop St, a negative lens L23, a positive lens L24, and a positive lens L25. Since the second lens group G2 includes one positive lens and one negative lens, by using only the second lens group G2, it is possible to suitably suppress the chromatic aberration. Thus, it becomes easy to correct distortion.

It is preferable that the second lens group G2 includes a cemented lens formed by cementing a negative lens and a positive lens, and a single lens which is disposed closer to the image side than the cemented lens and has a positive refractive power. FIG. 1 shows an example in which, in the second lens group G2, the negative lens L21 and the positive lens L22 are cemented, the negative lens L23 and the positive lens L24 are cemented, and the positive lens L25 is a single lens. By using the cemented lens formed by cementing the negative lens and the positive lens, there is an advantage in correcting field curvature and astigmatism while suitably suppressing chromatic aberration in the second lens group G2, and there is an advantage in reducing the size of the second lens group G2 in the optical axis direction. By using a single lens having a positive refractive power, there is an advantage in correcting spherical aberration.

Further, it is preferable that the second lens group G2 includes plural cemented lenses each of which is formed by cementing a negative lens and a positive lens, and a single lens which has a positive refractive power. By providing plural cemented lenses, the degree of freedom in design is increased, chromatic aberration can be more suitably suppressed in the second lens group G2. As a result, there is an advantage in reducing the size of the second lens group G2 in the optical axis direction. By using a single lens having a positive refractive power, there is an advantage in correcting spherical aberration.

It is preferable that the second lens group G2 includes an aperture stop St. FIG. 1 shows an example in which the second lens group G2 includes an aperture stop St. By disposing the aperture stop St in the second lens group G2 which is a focus group, it becomes easy to suppress change in optical performance in a case where the focus group moves. Further, the aperture stop St shown in FIG. 1 does not indicate a size and a shape thereof, but indicates a position thereof on the optical axis.

It is preferable that the second lens group G2 has lenses on the object side and the image side of the aperture stop St. FIG. 1 shows an example in which the second lens group G2 includes a negative lens L21 and a positive lens L22 on the object side of the aperture stop St, and a negative lens L23, a positive lens L24, and a positive lens L25 on the image side of the aperture stop St. Since the second lens group G2, which is the focus group, has lenses on the object side and the image side with the aperture stop St interposed therebetween, it becomes easier to suppress change in optical performance in a case where the focus group moves.

In the imaging lens of the present disclosure, it is preferable that the third lens group G3 includes a positive lens and a negative lens. For example, the third lens group G3 shown in FIG. 1 consists of a positive lens L31, a negative lens L32, a negative lens L33, and a positive lens L34. Since the third lens group G3 includes one positive lens and one negative lens, by using the third lens group G3 alone, it becomes easy to suitably suppress the chromatic aberration.

In the imaging lens of the present disclosure, it is preferable that during focusing from the object at infinity to the closest object, the first lens group G1 and the third lens group G3 remain stationary with respect to the image plane Sim and only the second lens group G2 is set as a focus group. By making the first lens group G1 and the third lens group G3 remain stationary with respect to the image plane Sim, it is possible to obtain dust-proof and drip-proof effects.

Next, the configuration relating to the conditional expression will be described. Assuming that a focal length of the first lens group G1 is f1, and a focal length of the second lens group G2 is f2, the imaging lens of the present disclosure satisfies Conditional Expression (1). By not allowing the result of Conditional Expression (1) to be equal to or less than the lower limit, the refractive power of the second lens group G2 is prevented from becoming excessively weak. Thus, there is an advantage in reducing the movement amount of the focus group during focusing. Consequently, there is an advantage in shortening the total length of the lens system. By not allowing the result of Conditional Expression (1) to be equal to or greater than the upper limit, a positive refractive power of the first lens group G1 is prevented from becoming excessively strong. Thus, it is possible to reduce the angle of the off-axis principal ray, which is incident from the first lens group G1 into the second lens group G2, with respect to the optical axis Z. As a result, there is an advantage in suppressing bleeding. It should be noted that more favorable characteristics can be obtained in a case where the configuration satisfies Conditional Expression (1-1) and even more favorable characteristics can be obtained in a case where the configuration satisfies Conditional Expression (1-2).

$$-0.5 < f2/f1 < 0.5 \tag{1}$$

$$-0.1 < f2/f1 < 0.5 \tag{1-1}$$

$$-0.05 < f2/f1 < 0.4 \tag{1-2}$$

Assuming that the focal length of the second lens group G2 is f2 and a focal length of the third lens group G3 is f3, it is preferable that the imaging lens of the present disclosure satisfies Conditional Expression (2). By not allowing the result of Conditional Expression (2) to be equal to or less than the lower limit, the refractive power of the third lens group G3 is prevented from becoming excessively strong. Therefore, change in angles of the rays incident into the third lens group G3 and the rays emitted from the third lens group G3 is not rapid. As a result, there is an advantage in suppressing bleeding. By not allowing the result of Conditional Expression (2) to be equal to or greater than the upper limit, the refractive power of the second lens group G2 is prevented from becoming excessively strong. Thus, by using the second lens group G2 alone, there is an advantage in suitably suppressing lateral chromatic aberration. In addition, in a case of a configuration in which Conditional Expression (2-1) is satisfied, it is possible to obtain more favorable characteristics.

$$1 < |f3/f2| < 3 \tag{2}$$

$$2 < |f3/f2| < 2.7 \tag{2-1}$$

Assuming that the focal length of the first lens group G1 is f1 and a distance on the optical axis from a lens surface closest to the object side to a lens surface closest to the image side in a state where the object at infinity is in focus is TTL, it is preferable that the imaging lens of the present disclosure satisfies Conditional Expression (3). By not allowing the result of Conditional Expression (3) to be equal to or less than the lower limit, a negative refractive power of the first lens group G1 is prevented from becoming excessively strong. Thus, there is an advantage in shortening the total length of the lens system. By not allowing the result of Conditional Expression (3) to be equal to or greater than the upper limit, a positive refractive power of the first lens group G1 is prevented from becoming excessively strong. Thus, it is possible to reduce the angle of the off-axis principal ray, which is incident from the first lens group G1 into the second lens group G2, with respect to the optical axis Z. As a result, there is an advantage in suppressing bleeding. In addition, in a case of a configuration in which Conditional Expression (3-1) is satisfied, it is possible to obtain more favorable characteristics.

$$-0.1 < TTL/f1 < 0.55 \tag{3}$$

$$-0.08 < TTL/f1 < 0.5 \tag{3-1}$$

Assuming that a focal length of the first lens group G1 is f1 and a focal length of the imaging lens in a state where an object at infinity is in focus is fA, it is preferable that the imaging lens of the present disclosure satisfies Conditional Expression (4). By not allowing the result of Conditional Expression (4) to be equal to or less than the lower limit, a negative refractive power of the first lens group G1 is prevented from becoming excessively strong. Thus, there is an advantage in shortening the total length of the lens system. By not allowing the result of Conditional Expression (4) to be equal to or greater than the upper limit, a positive refractive power of the first lens group G1 is prevented from becoming excessively strong. Thus, it is possible to reduce the angle of the off-axis principal ray, which is incident from the first lens group G1 into the second lens group G2, with respect to the optical axis Z. As a result, there is an advantage in suppressing bleeding. In addition, in a case of a configuration in which Conditional Expression (4-1) is satisfied, it is possible to obtain more favorable characteristics.

$$-0.1 < fA/f1 < 0.2 \quad (4)$$

$$-0.05 < fA/f1 < 0.16 \quad (4\text{-}1)$$

Assuming that the focal length of the first lens group G1 is f1 and a focal length of the third lens group G3 is f3, it is preferable that the imaging lens of the present disclosure satisfies Conditional Expression (5). By not allowing the result of Conditional Expression (5) to be equal to or less than the lower limit, a positive refractive power of the first lens group G1 is prevented from becoming excessively strong, and a positive refractive power of the second lens group G2 is relatively prevented from excessively becoming weak. Therefore, there is an advantage in reducing the movement amount of the focus group during focusing. Consequently, there is an advantage in reducing the total length of the lens system. By not allowing the result of Conditional Expression (5) to be equal to or greater than the upper limit, a negative refractive power of the first lens group G1 is prevented from becoming excessively strong. Thus, there is an advantage in shortening the total length of the lens system. Further, since the refractive power of the second lens group G2 is relatively prevented from becoming excessively strong, the change in angle between the ray incident into the second lens group G2 and the ray emitted from the second lens group G2 is prevented from becoming rapid. As a result, there is an advantage in suppressing bleeding. In addition, in a case of a configuration in which Conditional Expression (5-1) is satisfied, it is possible to obtain more favorable characteristics.

$$-1 < f3/f1 < 0.5 \quad (5)$$

$$-0.5 < f3/f1 < 0.1 \quad (5\text{-}1)$$

In the imaging lens according to the aspect of the present disclosure, it is preferable that a refractive index of a lens closest to the object side at the d line is 1.7 or more, and an Abbe number of a lens, which is second from the object side, based on the d line is 60 or more. By using a material having a refractive index of 1.7 or more, that is, a material having a high refractive index, for the lens closest to the object side, a negative refractive power of the lens closest to the object side can be strengthened. Thus, there is an advantage in reducing the size in the radial direction. By using a material having an Abbe number of 60 or more, that is, a low dispersion, for the lens which is second from the object side, there is an advantage in correcting chromatic aberration.

Assuming that an average value of Abbe numbers of a lens closest to the object side and a lens, which is second from the object side, based on the d line is v12, and an Abbe number of a lens, which is third from the object side, based on the d line is v3, it is preferable that the imaging lens of the present disclosure satisfies Conditional Expression (6). By not allowing the result of Conditional Expression (6) to be equal to or less than the lower limit, the chromatic dispersion of the lens closest to the object side is prevented from becoming excessively strong. Therefore, it becomes easy to correct chromatic aberration. By not allowing the result of Conditional Expression (6) to be equal to or greater than the upper limit, the lens closest to the object side and the lens which is second from the object side are not combinations of low-dispersion materials. Therefore, the negative refractive power of each lens is prevented from becoming excessively weak. As a result, there is an advantage in reducing the size in the radial direction. Moreover, since it is possible to select a material having an appropriate Abbe number, it becomes easy to correct chromatic aberration. In addition, in a case of a configuration in which Conditional Expression (6-1) is satisfied, it is possible to obtain more favorable characteristics.

$$25 < v12 - v3 < 45 \quad (6)$$

$$30 < v12 - v3 < 42 \quad (6\text{-}1)$$

Assuming that a lateral magnification of the second lens group G2 in a state where an object at infinity is in focus is β2, and a lateral magnification of the third lens group G3 in a state where the object at infinity is in focus is β3, it is preferable that the imaging lens of the present disclosure satisfies Conditional Expression (7). By not allowing the result of Conditional Expression (7) to be equal to or less than the lower limit, the refractive power of the second lens group G2 is prevented from becoming excessively weak. Thus, there is an advantage in reducing the movement amount of the focus group during focusing.

Consequently, there is an advantage in shortening the total length of the lens system. By not allowing the result of Conditional Expression (7) to be equal to or greater than the upper limit, the refractive power of the second lens group G2 is prevented from becoming excessively strong. Therefore, change in angles of the rays incident into the second lens group G2 and the rays emitted from the second lens group G2 is not rapid. As a result, there is an advantage in suppressing bleeding. In addition, in a case of a configuration in which Conditional Expression (7-1) is satisfied, it is possible to obtain more favorable characteristics.

$$1.5 < (1-\beta 2^2) \times \beta 3^2 < 2.5 \quad (7)$$

$$1.8 < (1-\beta 2^2) \times \beta 3^2 < 2.2 \quad (7\text{-}1)$$

Assuming that a lateral magnification of the third lens group G3 in a state where the object at infinity is in focus is β3, it is preferable that the imaging lens of the present disclosure satisfies Conditional Expression (8). By not allowing the result of Conditional Expression (8) to be equal to or less than the lower limit, the refractive power of the second lens group G2 is prevented from becoming excessively weak. Thus, there is an advantage in reducing the movement amount of the focus group during focusing. Consequently, there is an advantage in shortening the total length of the lens system. By not allowing the result of Conditional Expression (8) to be equal to or greater than the upper limit, a negative refractive power of the third lens group G3 is prevented from becoming excessively strong. Thus, there is an advantage in shortening the total length of the lens system. In addition, in a case of a configuration in which Conditional Expression (8-1) is satisfied, it is possible to obtain more favorable characteristics.

$$1.4 < \beta 3 < 1.55 \tag{8}$$

$$1.4 < \beta 3 < 1.5 \tag{8-1}$$

Assuming that a radius of curvature of an object side surface of a lens closest to the object side is R11, and a radius of curvature of an image side surface of the lens closest to the object side is R12, it is preferable that the imaging lens of the present disclosure satisfies Conditional Expression (9). In Conditional Expression (9), (R12−R11)/(R12+R11) is a term relating to the lens shape of the negative lens L11 in FIG. 1 as an example. By not allowing the result of Conditional Expression (9) to be equal to or less than the lower limit, the refractive power of the object side surface of the lens closest to the object side is prevented from becoming excessively weak, and the refraction of off-axis rays can be suitably controlled. Therefore, it becomes easy to correct distortion. By not allowing the result of Conditional Expression (9) to be equal to or greater than the upper limit, the refractive power of the image side surface of the lens closest to the object side is prevented from becoming excessively weak. Thus, there is an advantage in reducing the size in the radial direction. In addition, in a case of a configuration in which Conditional Expression (9-1) is satisfied, it is possible to obtain more favorable characteristics.

$$-1 < (R12-R11)/(R12+R11) < -0.5 \tag{9}$$

$$-0.8 < (R12-R11)/(R12+R11) < -0.6 \tag{9-1}$$

Assuming that a radius of curvature of an object side surface of a lens which is second from the object side is R21, and a radius of curvature of an image side surface of the lens which is second from the object side is R22, it is preferable that the imaging lens of the present disclosure satisfies Conditional Expression (10). In Conditional Expression (10), (R22+R21)/(R22−R21) is a term relating to the lens shape of the negative lens L12 in FIG. 1 as an example. By not allowing the result of Conditional Expression (10) to be equal to or less than the lower limit, the refractive power of the object side surface of the lens which is second from the object side is prevented from becoming excessively weak. Thus, there is an advantage in reducing the size in the radial direction. By not allowing the result of Conditional Expression (10) to be equal to or greater than the upper limit, the refractive power of the image side surface of the lens which is second from the object side is prevented from becoming excessively weak. As a result, it becomes easy to suppress sagittal coma aberration. In addition, in a case of a configuration in which Conditional Expression (10-1) is satisfied, it is possible to obtain more favorable characteristics.

$$-1.5 < (R22+R21)/(R22-R21) < 0.1 \tag{10}$$

$$-1 < (R22+R21)/(R22-R21) < 0.05 \tag{10-1}$$

The second lens group G2 may include the aperture stop St and may have lenses adjacent to the object side and the image side of the aperture stop St. In such a case, assuming that a radius of curvature of the image side surface of the lens adjacent to the object side of the aperture stop St is Rstf and a radius of curvature of the object side surface of the lens adjacent to the image side of the aperture stop St is Rstr, it is preferable that the imaging lens of the present disclosure satisfies Conditional Expression (11). As an example, (Rstr−Rstf)/(Rstr+Rstf) in Conditional Expression (11) is a term relating to the lens shape of the image side surface of the positive lens L22 and the object side surface of the negative lens L23 in FIG. 1. By not allowing the result of Conditional Expression (11) to be equal to or less than the lower limit, the total length of the second lens group G2 is prevented from becoming excessively large. Thus, there is an advantage in reducing the total length of the lens system. By not allowing the result of Conditional Expression (11) to be equal to or greater than the upper limit, the refractive power of the image side surface of the lens adjacent to the object side of the aperture stop St is prevented from becoming excessively strong. Therefore, change in angle of the ray before and after the aperture stop St can be reduced. As a result, there is an advantage in correcting various aberrations. In addition, in a case of a configuration in which Conditional Expression (11-1) is satisfied, it is possible to obtain more favorable characteristics.

$$-1 < (Rstr-Rstf)/(Rstr+Rstf) < -0.3 \tag{11}$$

$$-0.82 < (Rstr-Rstf)/(Rstr+Rstf) < -0.35 \tag{11-1}$$

The second lens group G2 may include the aperture stop St and may have lenses on the object side and the image side of the aperture stop St. In such a case, assuming that a combined focal length of all lenses closer to the object side than the aperture stop St in the second lens group G2 is f2f and a combined focal length of all the lenses closer to the image side than the aperture stop St in the second lens group G2 is f2r, it is preferable that the imaging lens of the present disclosure satisfies Conditional Expression (12). By not allowing the result of Conditional Expression (12) to be less than or equal to the lower limit, the refractive power closer to the image side than the aperture stop St in the second lens group G2 is prevented from becoming excessively weak, and the angle of the off-axis principal ray, which is emitted from the second lens group G2, with respect to the optical axis Z can be reduced. Thus, there is an advantage in suppressing bleeding. By not allowing the result of Conditional Expression (12) to be equal to or greater than the upper limit, the refractive power of the second lens group G2 closer to the object side than the aperture stop St is prevented from becoming excessively weak. Thus, the distances between the lenses before and after the aperture stop St can be reduced. Therefore, the total length of the second lens group G2 is prevented from becoming excessively large. Thus, there is an advantage in shortening the total length of the lens system. In addition, in a case of a configuration in which Conditional Expression (12-1) is satisfied, it is possible to obtain more favorable characteristics.

$$0 < f2f/f2r < 2.5 \tag{12}$$

$$0.8 < f2f/f2r < 2 \tag{12-1}$$

In a case where one lens component is one single lens or one cemented lens, assuming that a distance on the optical axis from a surface closest to the image side in a lens component which is second from the image side in the second lens group G2 to a surface closest to the object side in the lens component closest to the image side in the second lens group G2 is dd, and a distance on the optical axis from a lens surface closest to the object side in the second lens group G2 to a lens surface closest to the image side in the second lens group G2 is TTL2, it is preferable that the imaging lens of the present disclosure satisfies Conditional Expression (13). By not allowing the result of Conditional Expression (13) to be equal to or less than the lower limit, dd is prevented from becoming excessively small. Therefore, the angle of the off-axis principal ray with respect to the optical axis Z in the second lens group G2 can be sufficiently reduced. As a result, there is an advantage in suppressing coma aberration. By not allowing the result of Conditional Expression (13) to be equal to or greater than the upper limit, dd is prevented from becoming excessively large. Therefore, the total length of the second lens group G2 is prevented from becoming excessively large. Thus, there is an advantage in shortening the total length of the lens system. In addition, in a case of a configuration in which Conditional Expression (13-1) is satisfied, it is possible to obtain more favorable characteristics.

$$0.09 < dd/TTL2 < 0.17 \quad (13)$$

$$0.11 < dd/TTL2 < 0.15 \quad (13\text{-}1)$$

The above-mentioned preferred configurations and/or available configurations including the configurations relating to the conditional expressions may be optional combinations, and it is preferable to selectively adopt the configurations in accordance with the required specification.

Next, numerical examples of the imaging lens of the present disclosure will be described.

Example 1

FIG. 1 is a cross-sectional view showing a configuration of an imaging lens of Example 1, and an illustration method and a configuration thereof are as described above. Therefore, repeated description is partially omitted herein. The imaging lens of Example 1 consists of, in order from the object side to the image side, a first lens group G1 having a positive refractive power, a second lens group G2 having a positive refractive power, and a third lens group G3 having a negative refractive power. During focusing from the object at infinity to the closest object, the first lens group G1 and the third lens group G3 remain stationary with respect to the image plane Sim, and only the second lens group G2 moves to the object side along the optical axis Z. The first lens group G1 consists of four lenses L11 to L14 in order from the object side to the image side. The second lens group G2 consists of five lenses L21 to L25 in order from the object side to the image side. The third lens group G3 consists of four lenses L31 to L34 in order from the object side to the image side. The above is the outline of the imaging lens of Example 1.

Regarding the imaging lens of Example 1, Table 1 shows basic lens data, Table 2 shows a specification and variable surface distances, and Table 3 shows aspheric surface coefficients. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indexes of the constituent elements at the d line, and the column of vd shows Abbe numbers of the constituent elements based on the d line.

In Table 1, the sign of the radius of curvature of the surface convex toward the object side is positive and the sign of the radius of curvature of the surface convex toward the image side is negative. Table 1 also shows the aperture stop St and the optical member PP, and in the column of the surface number of the surface corresponding to the aperture stop St, the surface number and (St) are noted. In Table 1, the variable surface distances, which are distances variable during focusing, are referenced by the reference signs DD[ ], and are written into places of D, where object side surface numbers of distances are noted in [ ].

Table 2 shows the focal length f of the imaging lens and the value of the F number FNo. in a state where the object at infinity is in focus. Table 2 shows the values of the maximum total angle of view 2ω and the values of the variable surface distance in each of a state where the object at infinity is in focus and a state where the object at the object distance of 1.2 m (meter) is in focus. (°) in the place of 2ω indicates that the unit thereof is a degree. The object distance is a distance on the optical axis from the object to the image plane Sim. The respective values shown in Table 2 are values based on the d line.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=3, 4, 5, . . . , 20) shows numerical values of the aspheric surface coefficients for each aspheric surface. The "E±n" (n is an integer) in numerical values of the aspheric surface coefficients of Table 3 indicates "×10$^{\pm n}$". KA and Am are the aspheric surface coefficients in the aspheric surface expression represented by the following expression.

$$Zd = C \times h^2 / \{1 + (1 - KA \times C^2 \times h^2)^{1/2}\} \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd |
|---|---|---|---|---|
| *1 | 131.25880 | 2.000 | 1.85108 | 40.12 |
| *2 | 16.69358 | 8.020 | | |
| 3 | −66.86544 | 1.070 | 1.49700 | 81.59 |
| 4 | 66.86544 | 5.450 | | |
| 5 | 438.52916 | 3.050 | 1.78470 | 26.29 |
| 6 | −99.19269 | 4.690 | | |
| 7 | 49.02177 | 5.250 | 1.78590 | 44.21 |
| 8 | −89.73855 | DD[8] | | |
| 9 | 30.26741 | 1.290 | 1.79952 | 42.25 |
| 10 | 13.86500 | 6.750 | 1.62299 | 58.16 |
| 11 | 179.28363 | 6.560 | | |
| 12(St) | ∞ | 5.000 | | |
| 13 | 38.64477 | 1.500 | 1.95375 | 32.32 |
| 14 | 12.42900 | 5.990 | 1.49700 | 81.59 |
| 15 | 348.93176 | 4.670 | | |
| *16 | −153.06892 | 4.680 | 1.58135 | 59.38 |
| *17 | −18.27655 | DD[17] | | |
| 18 | −161.76271 | 5.340 | 2.00272 | 19.32 |
| 19 | −28.43000 | 1.210 | 1.73800 | 32.33 |

TABLE 1-continued

| | | Example 1 | | |
|---|---|---|---|---|
| Sn | R | D | Nd | vd |
| 20 | 42.00097 | 3.900 | | |
| 21 | −67.54157 | 1.020 | 1.94595 | 17.98 |
| 22 | −425.65965 | 3.050 | | |
| 23 | 125.03080 | 6.500 | 1.56883 | 56.06 |
| 24 | −60.39887 | 20.812 | | |
| 25 | ∞ | 3.200 | 1.51680 | 64.20 |
| 26 | ∞ | 0.020 | | |

TABLE 2

| | Example 1 | |
|---|---|---|
| | Infinity | 1.2 m |
| f | 30.890 | — |
| FNo. | 3.51 | — |
| 2ω (°) | 84.2 | 84.0 |
| DD[8] | 6.190 | 5.791 |
| DD[17] | 5.220 | 5.619 |

TABLE 3

| | | Example 1 | | |
|---|---|---|---|---|
| Sn | 1 | 2 | 16 | 17 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −2.8886874E−06 | −1.9266855E−05 | 1.1426426E−10 | 2.1286361E−05 |
| A5 | −6.5306725E−07 | −6.8136315E−07 | −5.7428082E−06 | −1.1336064E−05 |
| A6 | 2.0127359E−08 | −5.1386769E−08 | −5.1973760E−08 | 3.2648953E−06 |
| A7 | 1.3907664E−09 | 1.5435168E−09 | 2.9635184E−07 | −7.1293049E−07 |
| A8 | 1.3104211E−11 | −1.8823117E−10 | −1.8237844E−08 | 1.0856552E−07 |
| A9 | −2.3166044E−12 | 1.2882017E−11 | −9.4716911E−09 | −4.7133356E−09 |
| A10 | −1.5905045E−13 | −5.8433378E−14 | 8.3598439E−10 | −1.9454358E−09 |
| A11 | −3.5069163E−15 | −9.2461790E−14 | 2.1406144E−10 | 3.3012812E−10 |
| A12 | −4.0112500E−17 | 1.1586160E−14 | −2.2603381E−11 | 1.3422800E−12 |
| A13 | −1.3482658E−18 | −1.3601845E−15 | −2.7933578E−12 | −3.7812852E−12 |
| A14 | 2.3430938E−18 | 2.3396195E−17 | 3.2181986E−13 | 9.4470544E−14 |
| A15 | 7.8738693E−20 | 4.6200395E−18 | 2.2872157E−14 | 3.1663551E−14 |
| A16 | 6.0688836E−21 | −9.1617300E−19 | −2.6332566E−15 | −1.7021310E−15 |
| A17 | −5.8425280E−22 | 7.7555717E−20 | −1.0554255E−16 | −9.4195383E−17 |
| A18 | −6.8412335E−23 | −3.5245709E−22 | 9.1228254E−18 | 6.0289050E−18 |
| A19 | 4.7409996E−24 | −1.7353689E−22 | 6.2511786E−19 | 2.0266550E−19 |
| A20 | −7.1601272E−26 | 3.7488999E−24 | −3.9051285E−20 | −1.2179780E−20 |

Figure 2:
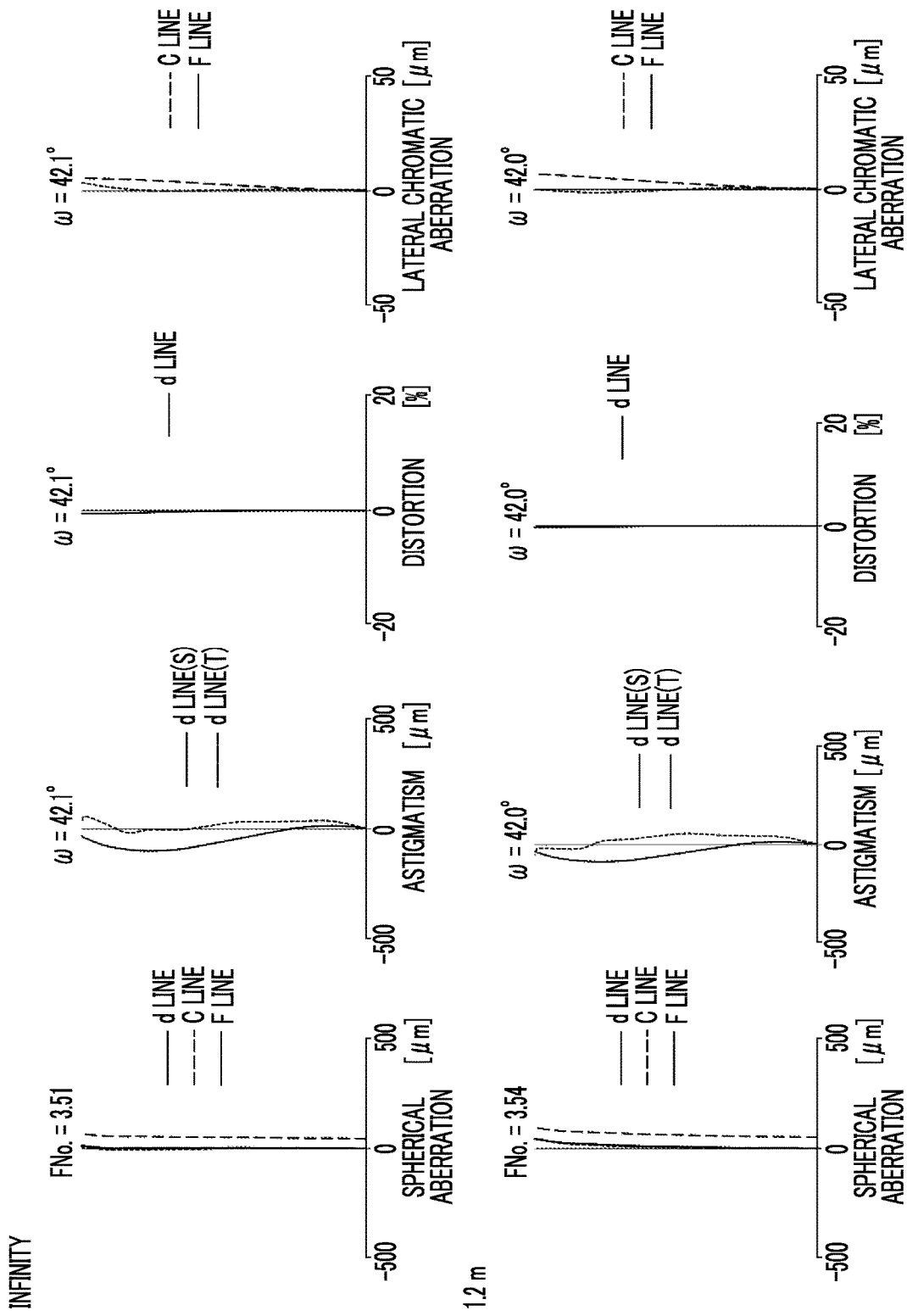
FIG. 2 shows spherical aberration diagrams, astigmatism diagrams, distortion diagrams, lateral chromatic aberration diagrams of the imaging lens of Example 1.

FIG. 2 shows spherical aberration diagrams, astigmatism diagrams, distortion diagrams, lateral chromatic aberration diagrams of the imaging lens of Example 1. In FIG. 2, the upper part labeled "INFINITY" shows aberration diagrams in a state where the object at infinity is in focus, and the lower part labeled "1.2 m" shows aberration diagrams in a state where an object at the object distance of 1.2 m (meter) is in focus. In the spherical aberration diagram, aberrations at the d line, the C line, and the F line are indicated by the solid line, the long dashed line, and the short dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, the aberrations at the C line and the F line are indicated by the long dashed line and the short dashed line, respectively. In the spherical aberration diagram, FNo. indicates an F number. In the other aberration diagrams, w indicates a half angle of view. FIG. 2 shows values of FNo. and w corresponding to the upper part in the vertical axis of each diagram.

Figure 3:
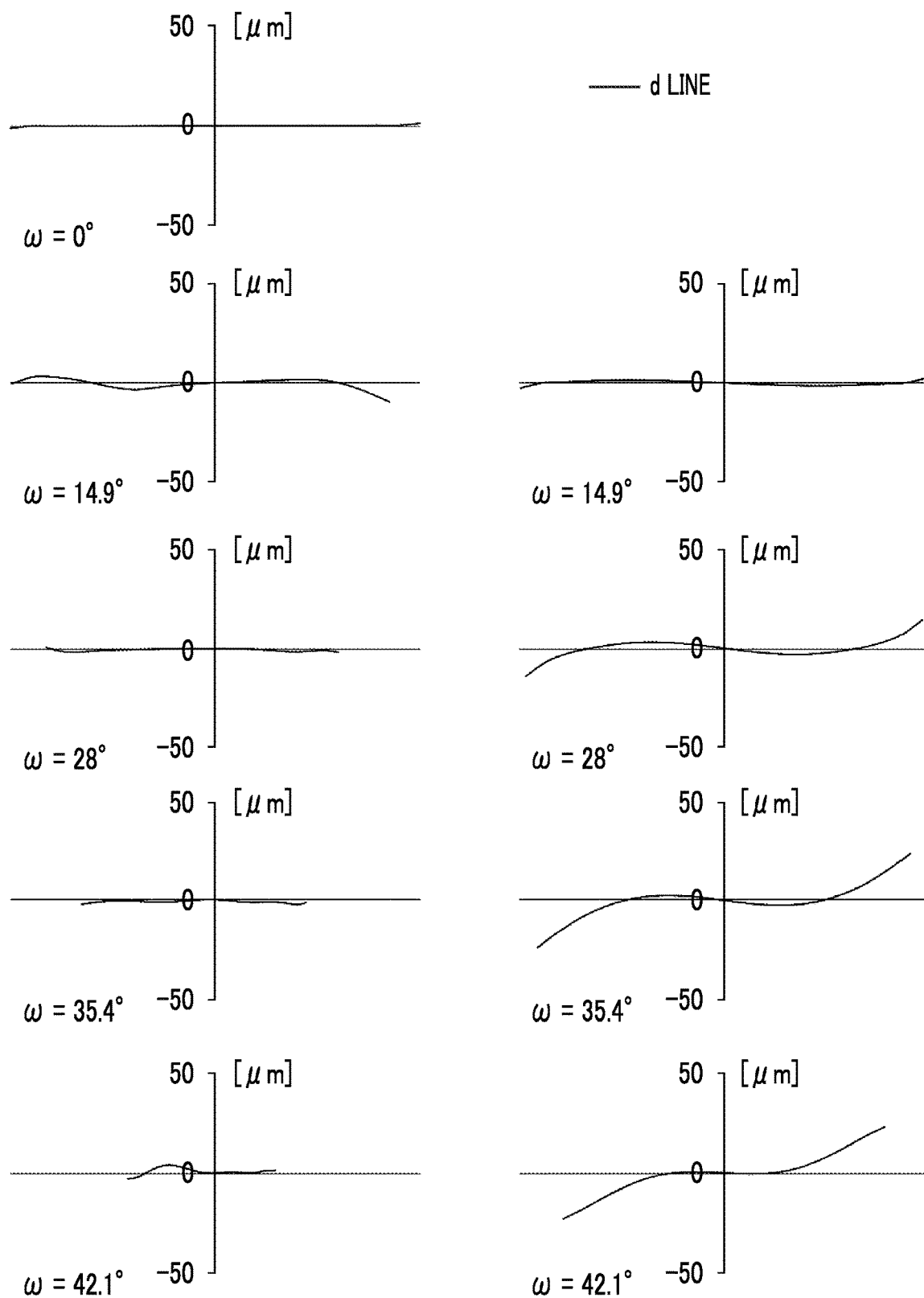
FIG. 3 shows lateral aberration diagrams of the imaging lens according to Example 1.

FIG. 3 shows a lateral aberration diagram at the d line of the imaging lens of Example 1. In FIG. 3, the left column shows tangential aberration, and the right column shows sagittal aberration for each half angle of view. In FIG. 3, w means a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 4:
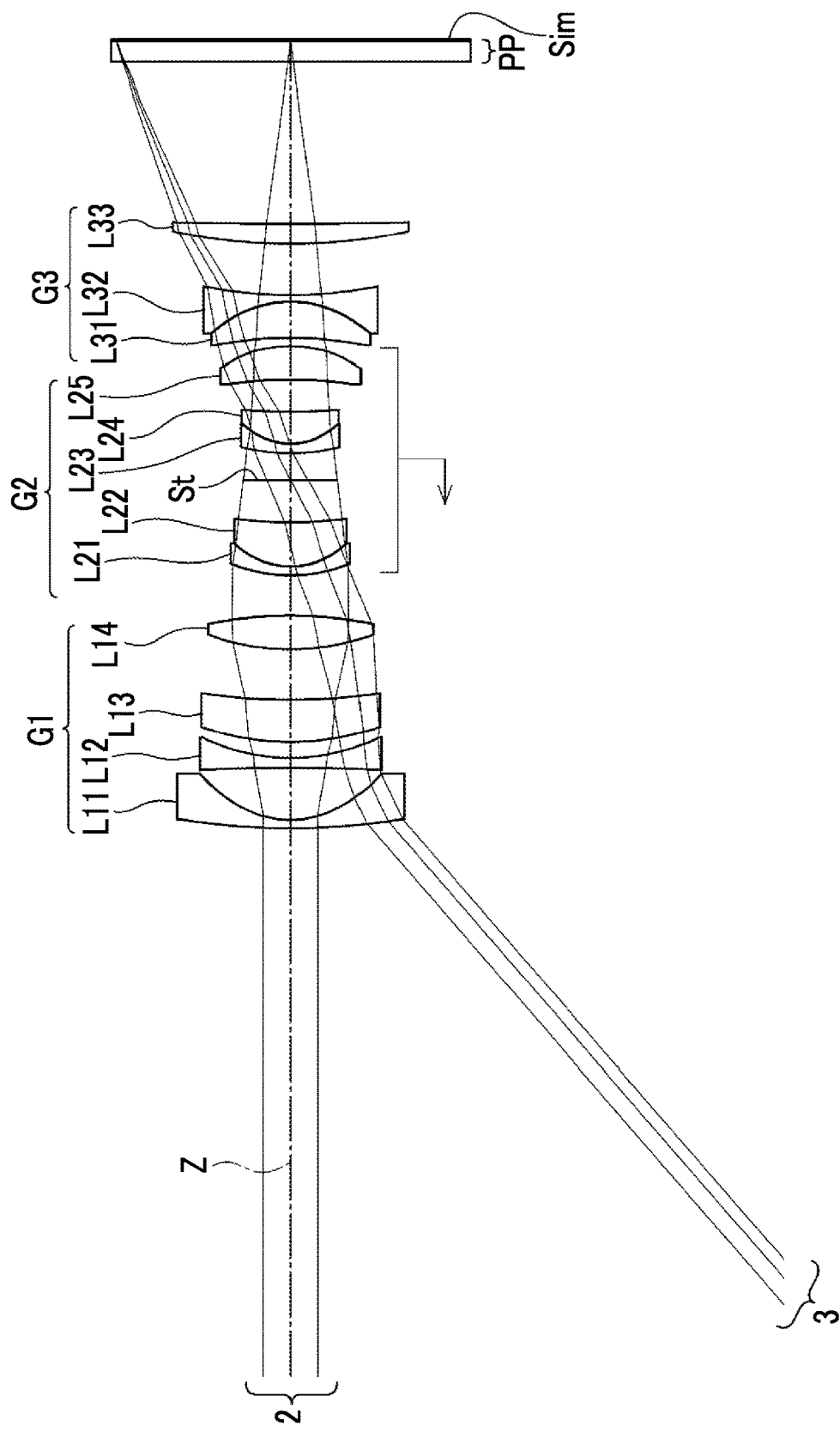
FIG. 4 is a cross-sectional view showing a configuration and optical paths of an imaging lens of Example 2.
Figure 5:
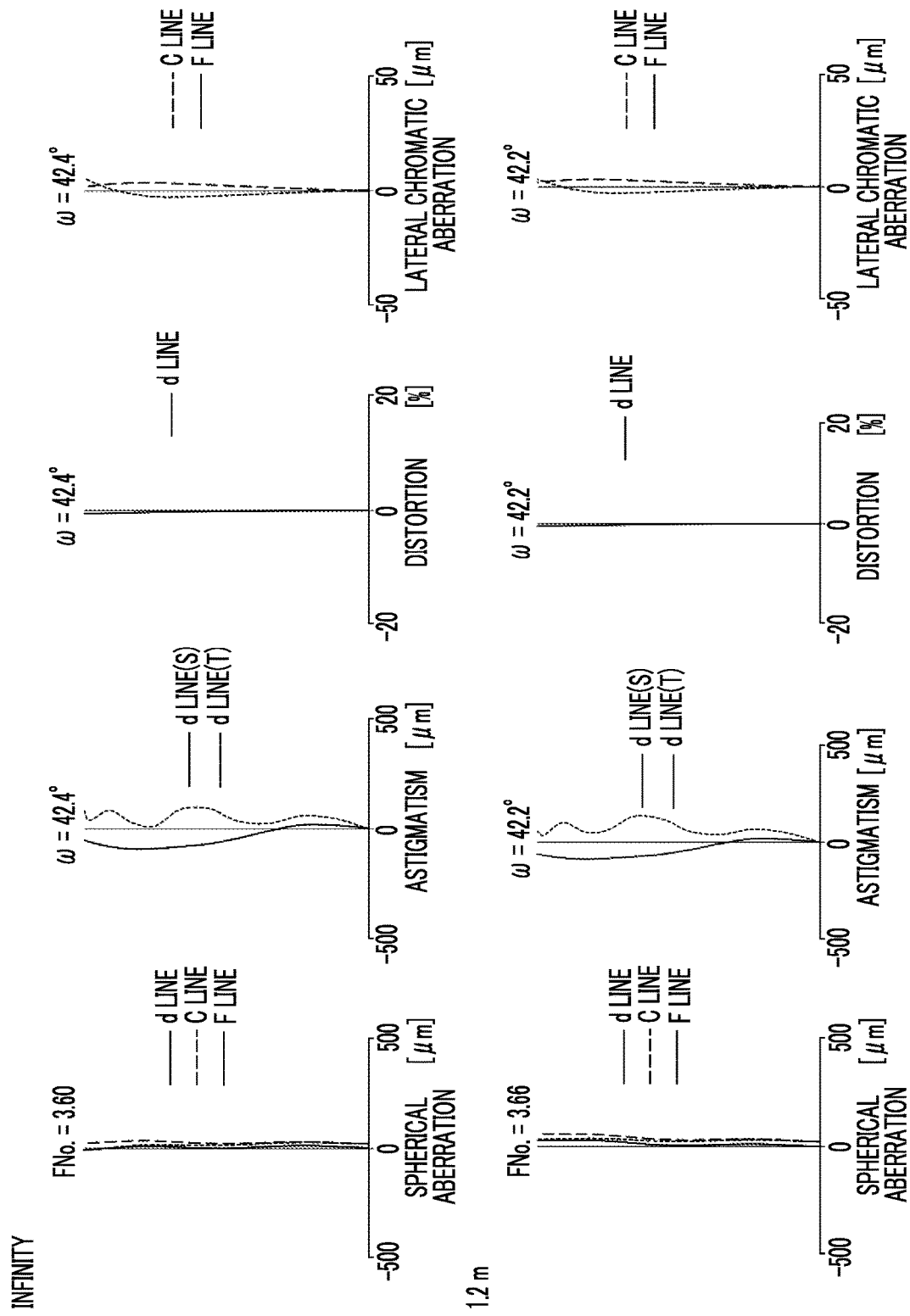
FIG. 5 shows spherical aberration diagrams, astigmatism diagrams, distortion diagrams, lateral chromatic aberration diagrams of the imaging lens of Example 2.
Figure 6:
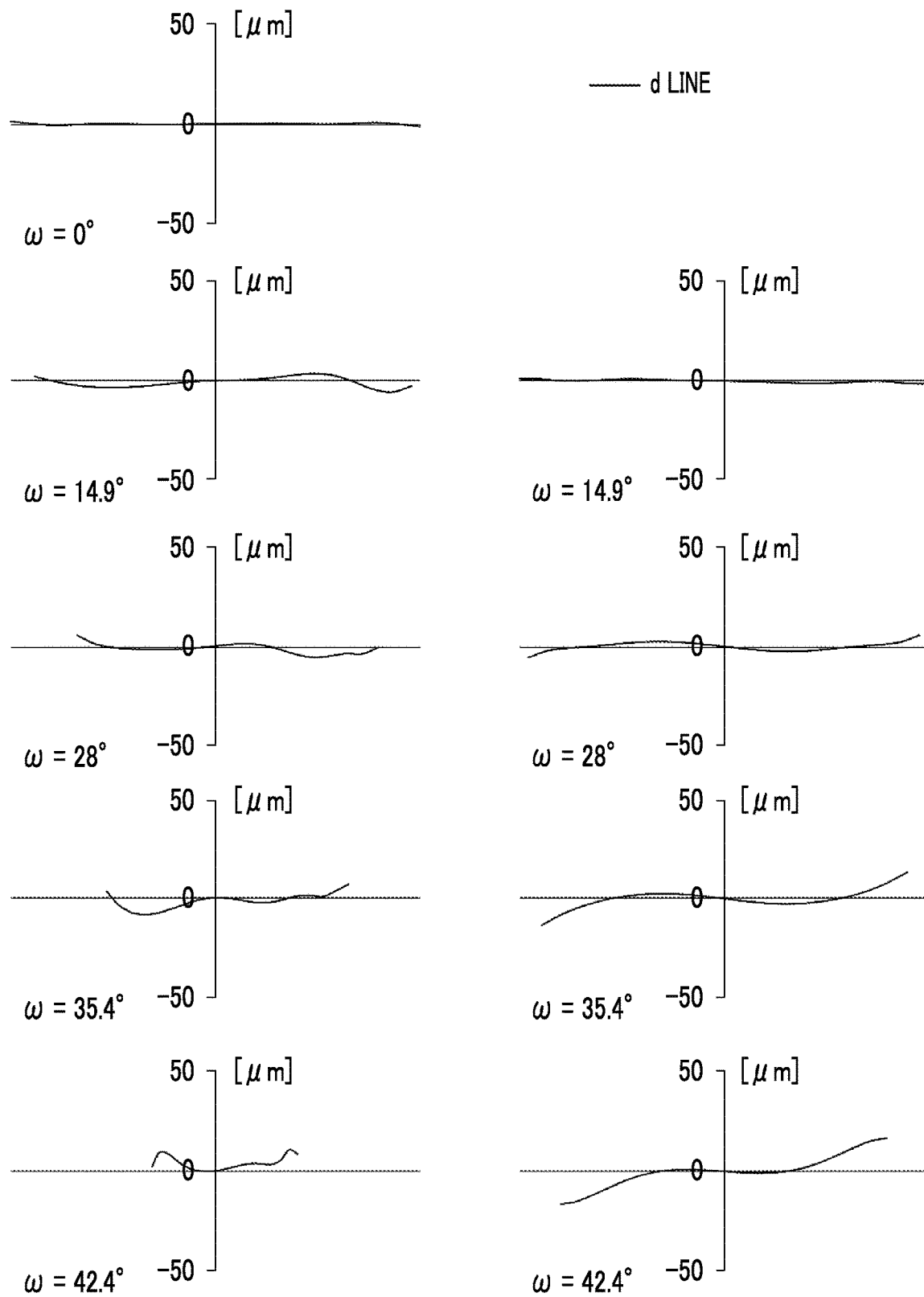
FIG. 6 shows lateral aberration diagrams of the imaging lens according to Example 2.

FIG. 4 is a cross-sectional view showing a configuration of the imaging lens of Example 2. The imaging lens of Example 2 has the same configuration as the outline of the imaging lens of Example 1 except that the third lens group G3 consists of three lenses L31 to L33 in order from the object side to the image side. Regarding the imaging lens of Example 2, Table 4 shows basic lens data, Table 5 shows specification and variable surface distances, and Table 6 shows aspheric surface coefficients. FIG. 5 shows aberration diagrams and FIG. 6 shows lateral aberration diagrams.

TABLE 4

| | Example 2 | | | |
|---|---|---|---|---|
| Sn | R | D | Nd | vd |
| *1 | 104.47029 | 1.291 | 1.75370 | 52.63 |
| *2 | 15.89522 | 7.970 | | |
| 3 | −291.95379 | 1.500 | 1.51600 | 77.54 |
| 4 | 31.93399 | 2.445 | | |
| 5 | 42.75743 | 6.506 | 1.82507 | 23.76 |
| 6 | 100.97491 | 7.680 | | |
| 7 | 38.55662 | 5.135 | 1.58000 | 63.82 |
| 8 | −65.12036 | DD[8] | | |
| 9 | 24.69836 | 1.410 | 1.76081 | 41.68 |
| 10 | 12.91696 | 6.711 | 1.62049 | 60.37 |
| 11 | 71.38147 | 6.510 | | |
| 12(St) | ∞ | 4.056 | | |
| 13 | 32.08293 | 1.500 | 1.88927 | 39.07 |

TABLE 4-continued

Example 2

| Sn | R | D | Nd | νd |
|---|---|---|---|---|
| 14 | 10.85144 | 4.843 | 1.58961 | 66.21 |
| 15 | 107.18997 | 4.900 | | |
| *16 | −89.90856 | 5.000 | 1.54955 | 63.09 |
| *17 | −20.85723 | DD[17] | | |
| 18 | −64.08739 | 5.516 | 2.00000 | 19.84 |
| 19 | −18.12725 | 1.010 | 1.80000 | 25.00 |
| 20 | 69.23273 | 7.830 | | |
| 21 | 89.85994 | 3.122 | 1.66118 | 58.44 |
| 22 | 901.54915 | 24.875 | | |
| 23 | ∞ | 3.200 | 1.51680 | 64.20 |
| 24 | ∞ | 0.003 | | |

TABLE 5

Example 2

| | Infinity | 1.2 m |
|---|---|---|
| f | 30.906 | — |
| FNo. | 3.60 | — |
| 2ω (°) | 84.8 | 84.4 |
| DD[8] | 6.102 | 5.663 |
| DD[17] | 1.237 | 1.676 |

TABLE 6

Example 2

| Sn | 1 | 2 | 16 | 17 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.0288468E−05 | −2.5251951E−06 | −2.7724468E−05 | 4.7085228E−08 |
| A5 | −9.4999688E−07 | −1.7502288E−06 | 9.4568703E−07 | −2.7316900E−06 |
| A6 | 1.0087618E−08 | 3.8008839E−08 | −1.1586850E−07 | 4.8467173E−07 |
| A7 | 4.0896001E−11 | 7.6773366E−10 | −7.8626675E−08 | −7.6590038E−08 |
| A8 | 3.7316777E−11 | −3.7247454E−10 | 6.2147787E−09 | 3.2996243E−09 |
| A9 | 2.3147219E−13 | −1.3229091E−11 | 1.9094713E−09 | 1.4969822E−10 |
| A10 | −3.1159720E−14 | −4.4887710E−13 | −7.3415852E−11 | 1.1199435E−11 |
| A11 | −4.1643952E−15 | −5.1085339E−14 | −1.6691031E−11 | −2.5607321E−13 |
| A12 | −1.6848162E−16 | 1.2046523E−14 | −1.2011700E−12 | −8.8958188E−14 |
| A13 | −2.3056204E−17 | −7.0899201E−16 | 1.9822903E−13 | −4.2686601E−14 |
| A14 | 2.4631948E−18 | 4.0890638E−17 | −2.3701735E−16 | 9.8090849E−16 |
| A15 | 7.1204198E−20 | 2.6780382E−18 | 1.3981547E−16 | 3.0250212E−16 |
| A16 | 8.7300955E−21 | −9.5043250E−19 | −8.1283916E−17 | 1.0082628E−17 |
| A17 | −5.4394755E−22 | 7.2501252E−20 | 3.4758445E−17 | −1.7896603E−19 |
| A18 | −4.8998053E−23 | −5.5528618E−22 | −1.0699300E−18 | −9.8619023E−21 |
| A19 | 1.6612900E−24 | −1.7085435E−22 | −4.5723232E−19 | −3.2839404E−20 |
| A20 | 2.3913314E−26 | 4.4479295E−24 | 2.8967385E−20 | 2.1095476E−21 |

Example 3

Figure 7:
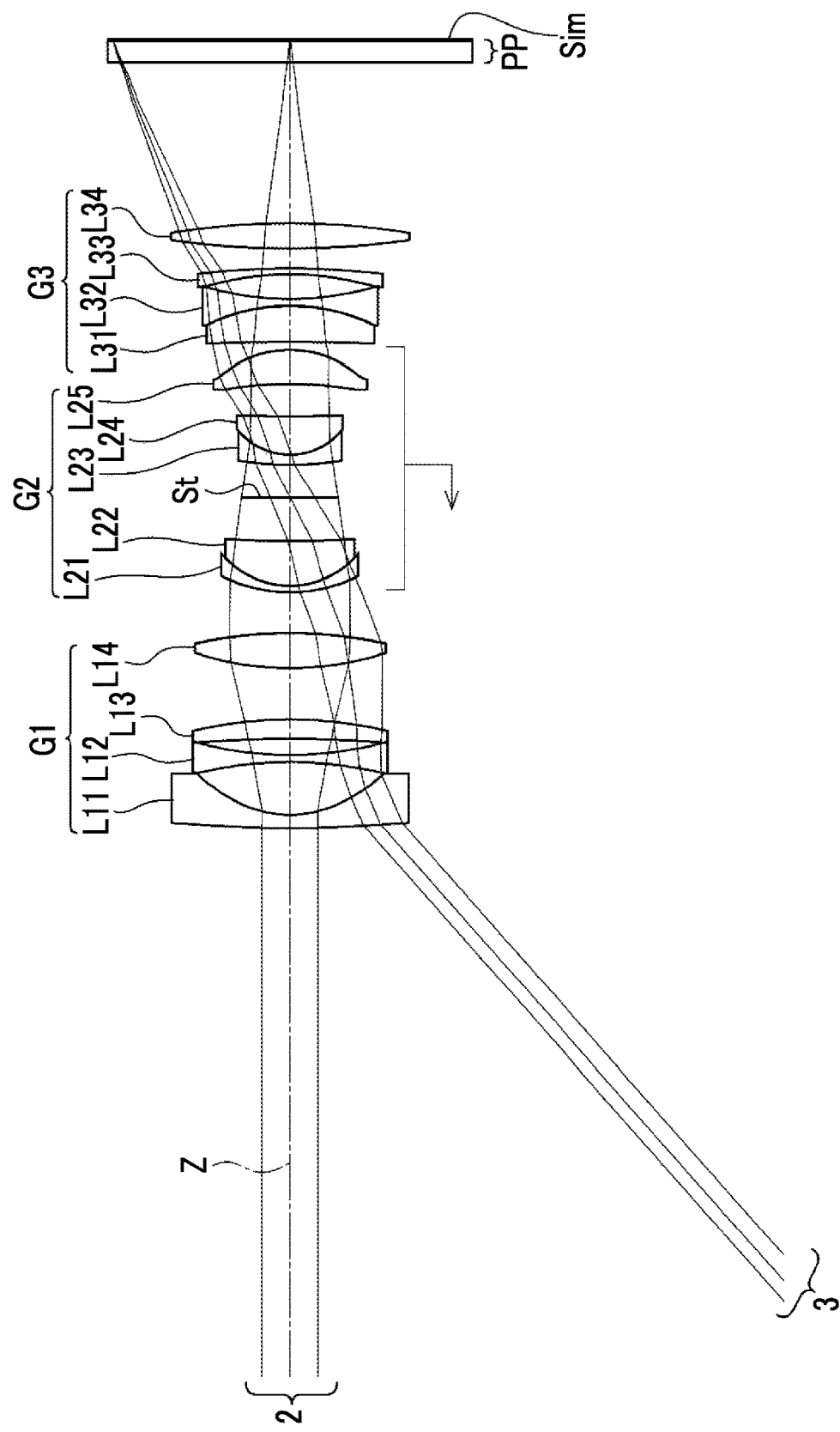
FIG. 7 is a cross-sectional view showing a configuration and optical paths of an imaging lens of Example 3.
Figure 8:
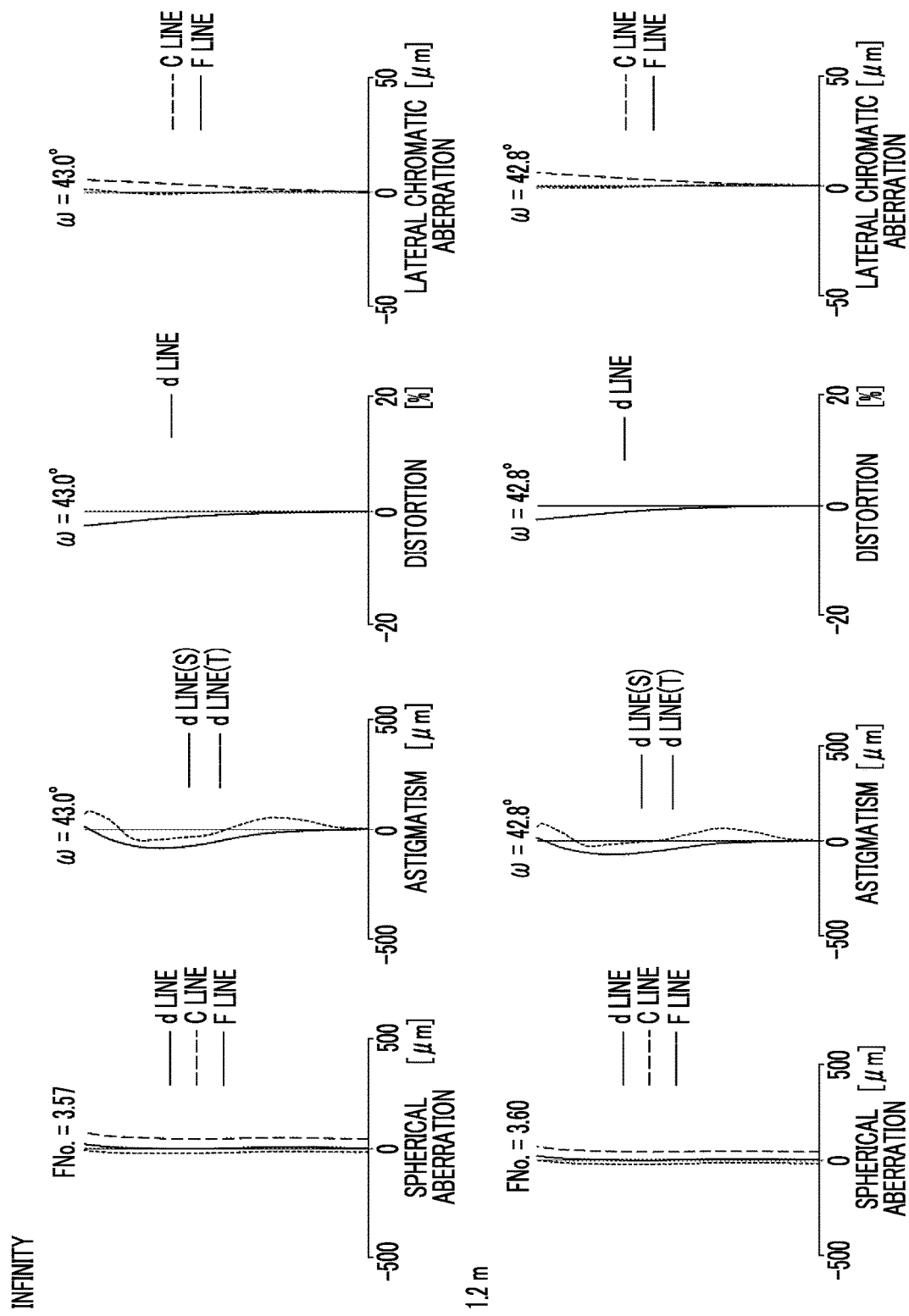
FIG. 8 shows spherical aberration diagrams, astigmatism diagrams, distortion diagrams, lateral chromatic aberration diagrams of the imaging lens of Example 3.
Figure 9:
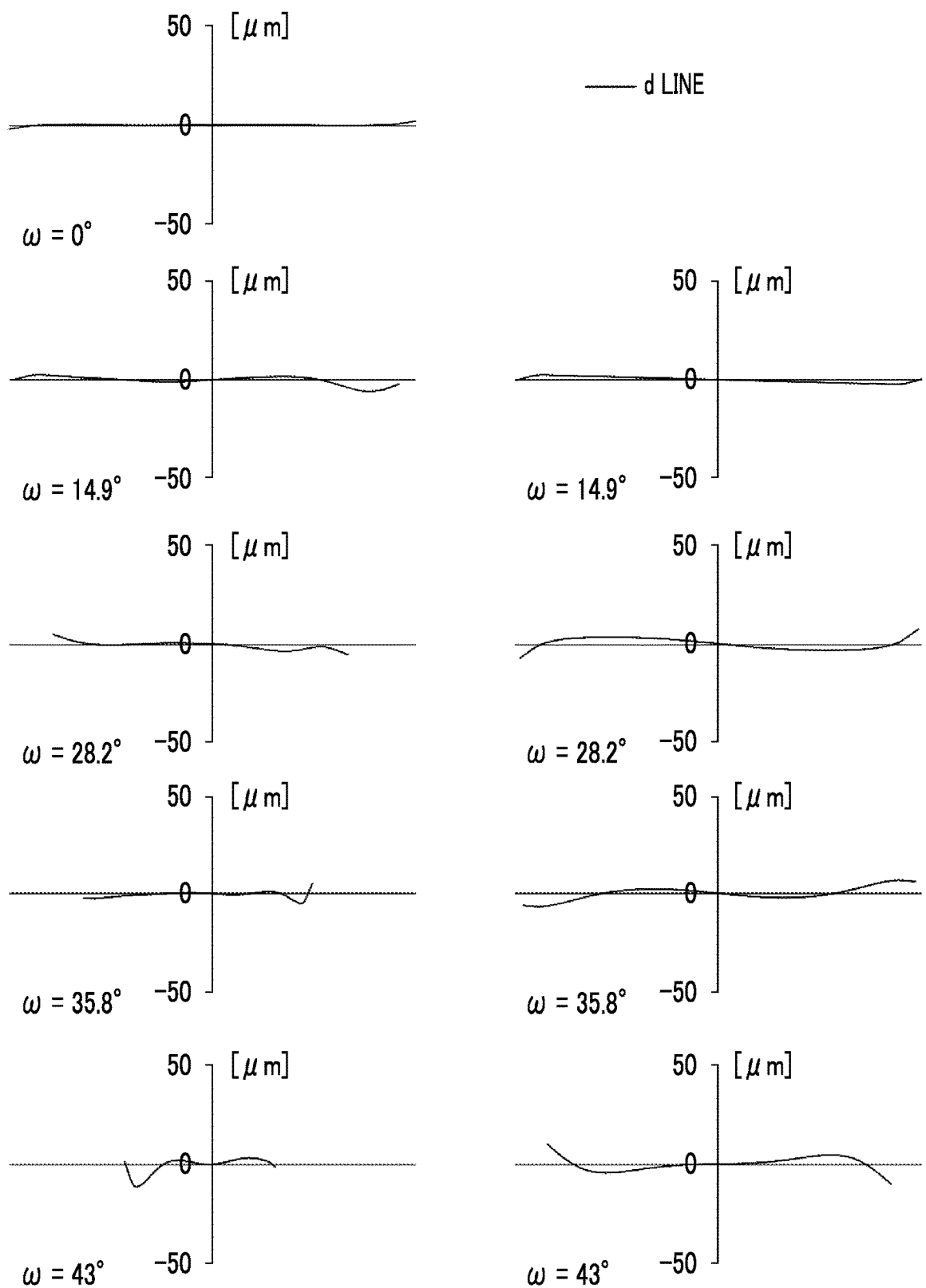
FIG. 9 shows lateral aberration diagrams of the imaging lens according to Example 3.

FIG. 7 is a cross-sectional view showing a configuration of the imaging lens of Example 3. The imaging lens of Example 3 has the same configuration as the outline of the imaging lens of Example 1 except that the first lens group G1 has a negative refractive power as a whole. Regarding the imaging lens of Example 3, Table 7 shows basic lens data, Table 8 shows specification and variable surface distances, and Table 9 shows aspheric surface coefficients. FIG. 8 shows aberration diagrams and FIG. 9 shows lateral aberration diagrams.

TABLE 7

Example 3

| Sn | R | D | Nd | νd |
|---|---|---|---|---|
| *1 | 147.31292 | 2.000 | 1.81000 | 41.00 |
| *2 | 17.38594 | 7.970 | | |
| 3 | −61.02975 | 1.050 | 1.49700 | 81.59 |
| 4 | 55.99901 | 2.444 | | |
| 5 | −175.23762 | 2.994 | 1.71736 | 29.51 |
| 6 | −64.67485 | 7.677 | | |
| 7 | 47.96286 | 5.233 | 1.72000 | 43.69 |
| 8 | −71.42953 | DD[8] | | |
| 9 | 24.00874 | 1.000 | 1.80166 | 44.28 |
| 10 | 14.00153 | 6.713 | 1.60042 | 61.94 |
| 11 | 156.45803 | 6.513 | | |
| 12(St) | ∞ | 4.988 | | |
| 13 | 48.14207 | 1.500 | 1.91082 | 35.25 |
| 14 | 10.59120 | 5.790 | 1.56907 | 71.31 |
| 15 | 346.00707 | 4.853 | | |
| *16 | −84.02309 | 5.000 | 1.58913 | 61.15 |
| *17 | −18.00757 | DD[17] | | |
| 18 | −356.46683 | 5.407 | 2.00272 | 19.32 |
| 19 | −30.01424 | 1.026 | 1.73800 | 32.33 |
| 20 | 48.39223 | 3.672 | | |
| 21 | −48.10262 | 0.900 | 1.98613 | 16.48 |

TABLE 7-continued

Example 3

| Sn | R | D | Nd | νd |
|---|---|---|---|---|
| 22 | −122.10592 | 3.020 | | |
| 23 | 137.79530 | 3.842 | 1.63545 | 59.73 |
| 24 | −115.98254 | 24.391 | | |
| 25 | ∞ | 3.200 | 1.51680 | 64.20 |
| 26 | ∞ | 0.023 | | |

TABLE 8

| | Example 3 | |
|---|---|---|
| | Infinity | 1.2 m |
| f | 30.913 | — |
| FNo. | 3.57 | — |
| 2ω (°) | 86.0 | 85.6 |
| DD[8] | 6.126 | 5.702 |
| DD[17] | 1.232 | 1.656 |

TABLE 9

| | Example 3 | | | |
|---|---|---|---|---|
| Sn | 1 | 2 | 16 | 17 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.7190323E-06 | -1.0324755E-05 | -3.6874743E-05 | -1.7507432E-05 |
| A5 | -7.4474335E-07 | -9.9518618E-07 | 1.5262016E-06 | 1.8963888E-06 |
| A6 | 3.0051321E-08 | -6.4950083E-09 | 2.2784479E-07 | -1.6630172E-07 |
| A7 | 8.1417469E-12 | 1.0528595E-09 | -9.8209300E-08 | -4.0718008E-08 |
| A8 | 2.6419440E-11 | -1.9802457E-10 | 4.2866430E-10 | 3.0729611E-09 |
| A9 | -8.4613032E-13 | 9.3801528E-12 | 1.4337539E-09 | 2.2019263E-10 |
| A10 | -6.7674963E-14 | -2.6840622E-14 | 4.1053517E-11 | -1.0135846E-11 |
| A11 | -5.2825214E-15 | -9.6141003E-14 | -1.4808362E-11 | -1.3635971E-12 |
| A12 | 1.3685955E-17 | 9.2320265E-15 | -7.4799199E-13 | 3.6925212E-14 |
| A13 | -2.1817230E-17 | -9.7218804E-16 | 9.9226988E-14 | -2.6847120E-14 |
| A14 | 1.9880799E-18 | 3.3672325E-17 | 2.1856025E-15 | 1.3212027E-15 |
| A15 | 7.8661839E-20 | 4.2370872E-18 | 2.2178857E-16 | 1.8274698E-16 |
| A16 | 9.0261546E-21 | -9.1536371E-19 | -2.2420853E-16 | 3.5944816E-17 |
| A17 | -5.4358767E-22 | 7.0329374E-20 | 3.2929455E-17 | -3.1433068E-18 |
| A18 | -4.4806487E-23 | -3.5736344E-22 | 2.2161945E-19 | -6.0753510E-19 |
| A19 | 2.0403062E-24 | -1.5453784E-22 | -2.7567893E-19 | 6.0854810E-20 |
| A20 | -5.5439226E-27 | 3.7714093E-24 | 1.1764954E-20 | -9.4474266E-22 |

Example 4

Figure 10:
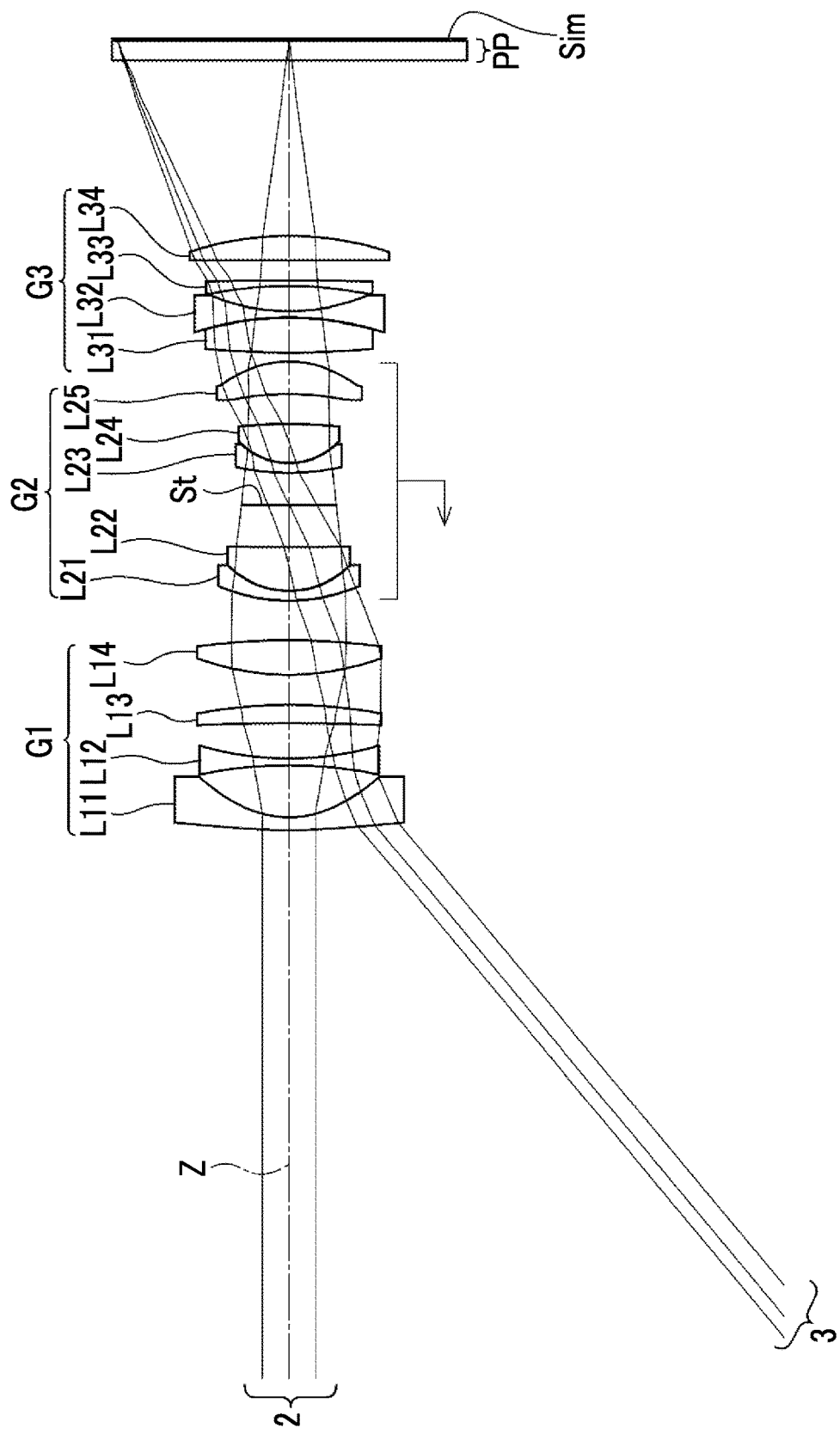
FIG. 10 is a cross-sectional view showing a configuration and optical paths of an imaging lens of Example 4.
Figure 11:
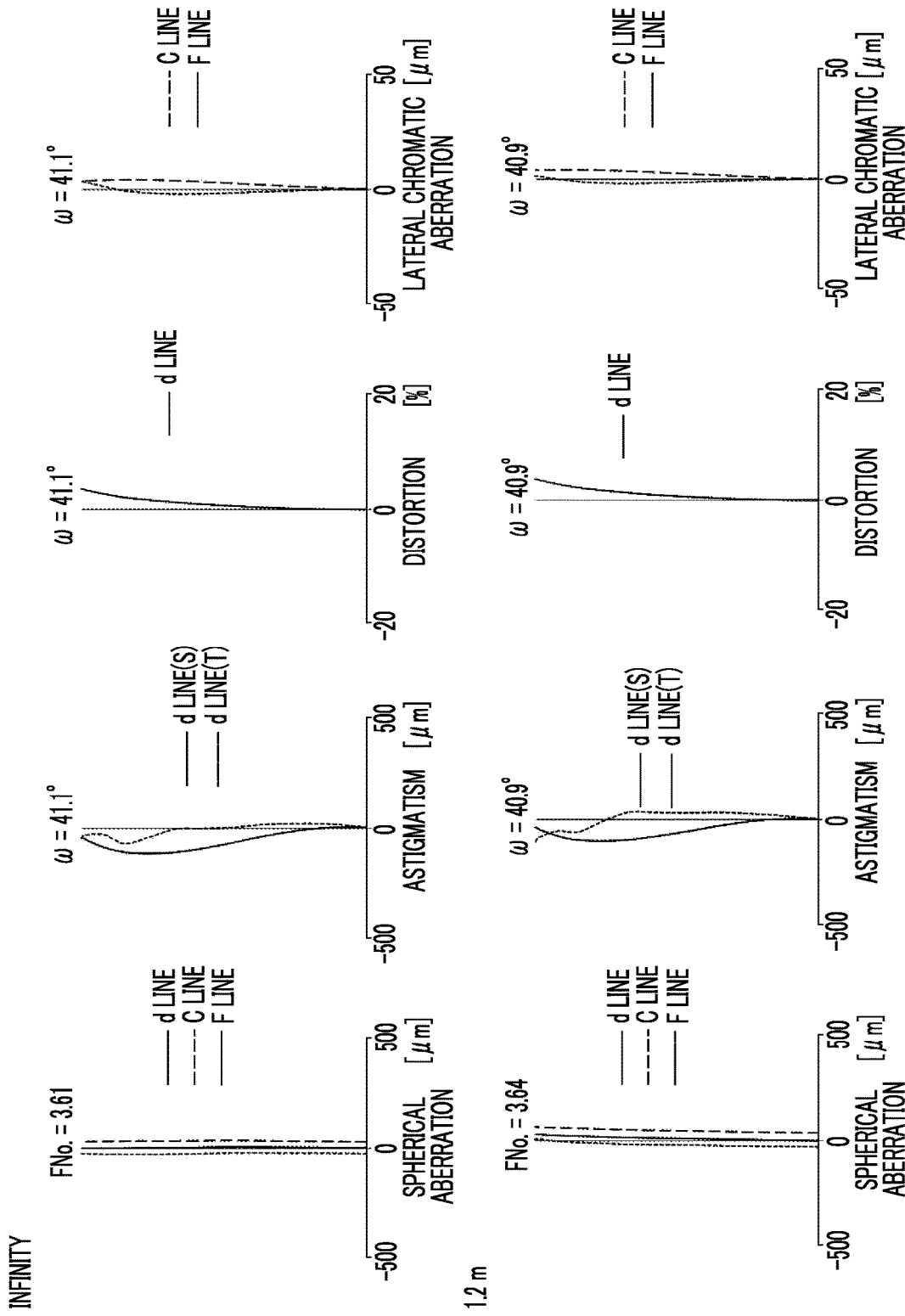
FIG. 11 shows spherical aberration diagrams, astigmatism diagrams, distortion diagrams, lateral chromatic aberration diagrams of the imaging lens of Example 4.
Figure 12:
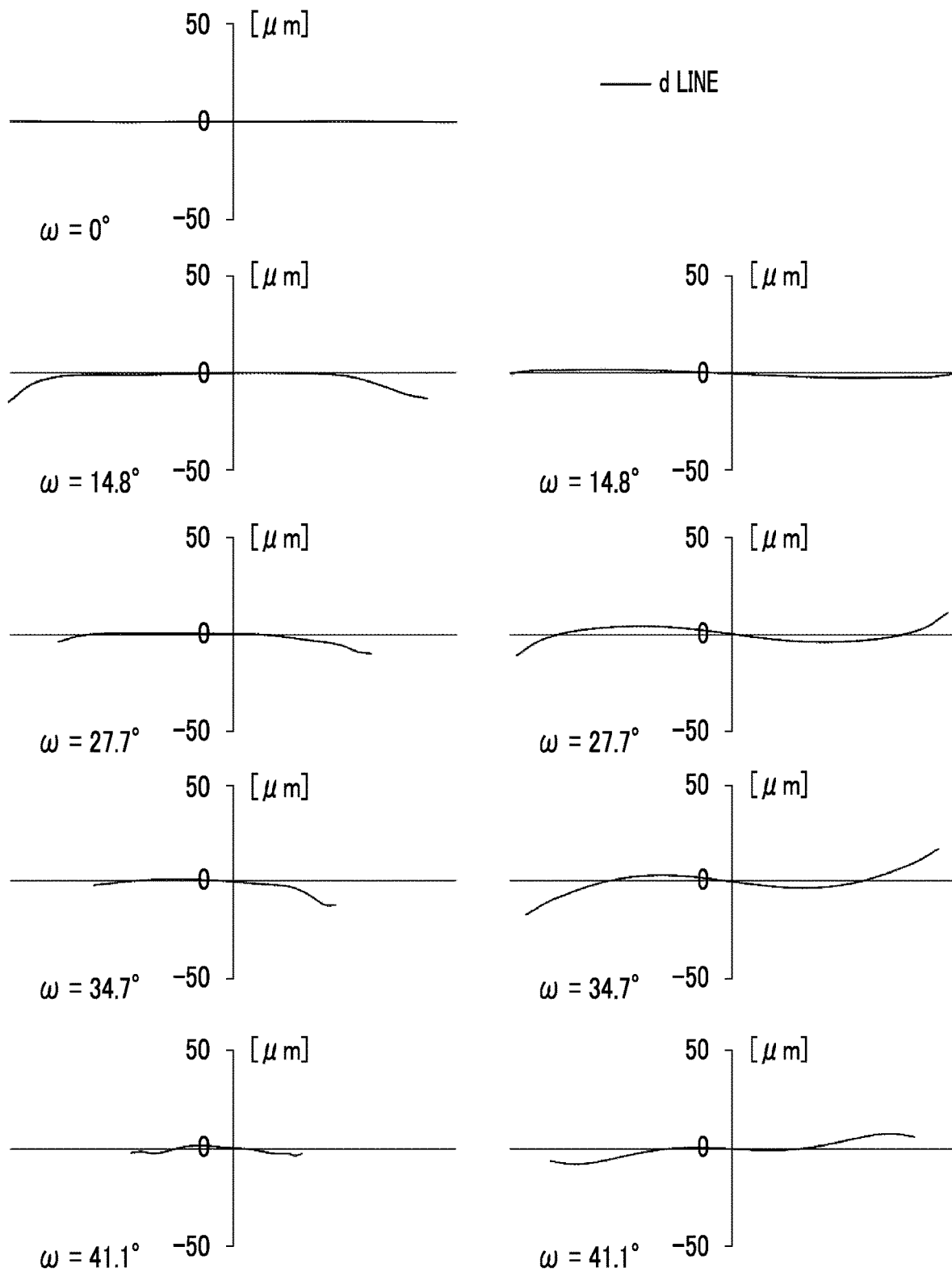
FIG. 12 shows lateral aberration diagrams of the imaging lens according to Example 4.

FIG. 10 is a cross-sectional view showing a configuration of the imaging lens of Example 4. The imaging lens of Example 4 has the same configuration as the outline of the imaging lens of Example 1. Regarding the imaging lens of Example 4, Table 10 shows basic lens data, Table 11 shows specification and variable surface distances, and Table 12 shows aspheric surface coefficients. FIG. 11 shows aberration diagrams and FIG. 12 shows lateral aberration diagrams.

TABLE 10

| | Example 4 | | | |
|---|---|---|---|---|
| Sn | R | D | Nd | vd |
| *1 | 89.72389 | 2.000 | 1.81000 | 41.00 |
| *2 | 16.34104 | 8.020 | | |
| 3 | -71.73549 | 1.050 | 1.49700 | 81.59 |
| 4 | 50.83843 | 5.450 | | |
| 5 | -330.93917 | 2.717 | 1.72397 | 28.80 |
| 6 | -80.02855 | 4.690 | | |
| 7 | 44.14348 | 5.273 | 1.78590 | 44.21 |
| 8 | -113.03519 | DD[8] | | |
| 9 | 28.92056 | 1.500 | 1.79450 | 45.39 |
| 10 | 13.93312 | 6.726 | 1.60311 | 60.64 |
| 11 | 368.25947 | 6.547 | | |
| 12(St) | ∞ | 5.000 | | |
| 13 | 40.93425 | 1.500 | 1.90070 | 37.05 |
| 14 | 11.21704 | 6.010 | 1.49600 | 81.76 |
| 15 | -83.89388 | 4.666 | | |
| *16 | -46.50945 | 5.000 | 1.59554 | 61.33 |
| *17 | -17.52221 | DD[17] | | |
| 18 | 157.26048 | 5.351 | 2.00272 | 19.32 |
| 19 | -51.23987 | 1.010 | 1.73800 | 32.33 |
| 20 | 32.64581 | 3.888 | | |
| 21 | -65.49325 | 0.900 | 1.94595 | 17.98 |
| 22 | -467.51328 | 3.032 | | |
| 23 | ∞ | 3.832 | 1.63000 | 60.00 |
| 24 | -50.44990 | 27.349 | | |
| 25 | ∞ | 3.200 | 1.51680 | 64.20 |
| 26 | ∞ | 0.017 | | |

TABLE 11

| | Example 4 | |
|---|---|---|
| | Infinity | 1.2 m |
| f | 30.911 | — |
| FNo. | 3.61 | — |
| 2ω (°) | 82.2 | 81.8 |
| DD[8] | 6.204 | 5.765 |
| DD[17] | 1.500 | 1.939 |

TABLE 12

| | Example 4 | |
|---|---|---|
| Sn | 1 | 2 |
| KA | 1.0000000E+00 | 1.0000000E+00 |
| A3 | 0.0000000E+00 | 0.0000000E+00 |
| A4 | -3.4155625E-06 | -1.9107463E-05 |

TABLE 12-continued

| | Example 4 | |
|---|---|---|
| Sn | 1 | 2 |
| A5 | −6.5512662E−07 | −1.1416274E−06 |
| A6 | 2.6880842E−08 | −1.1657866E−09 |
| A7 | 3.4247514E−10 | −4.9500638E−10 |
| A8 | 2.3685629E−11 | −2.4119314E−10 |
| A9 | −5.8156453E−13 | 8.3170627E−12 |
| A10 | −6.5088755E−14 | −7.1324595E−14 |
| A11 | −7.8198378E−15 | −7.0073316E−14 |
| A12 | 7.8587704E−17 | 8.2513891E−15 |
| A13 | −2.3430565E−17 | −8.6549574E−16 |
| A14 | 2.3366340E−18 | 2.8635869E−17 |
| A15 | 7.6226720E−20 | 3.9009264E−18 |
| A16 | 9.4130546E−21 | −9.5613959E−19 |
| A17 | −6.2440394E−22 | 7.1920293E−20 |
| A18 | −4.8935171E−23 | −3.9924657E−22 |
| A19 | 2.2440208E−24 | −1.4860612E−22 |
| A20 | 3.5231466E−28 | 3.4475197E−24 |

Example 5

Figure 13:
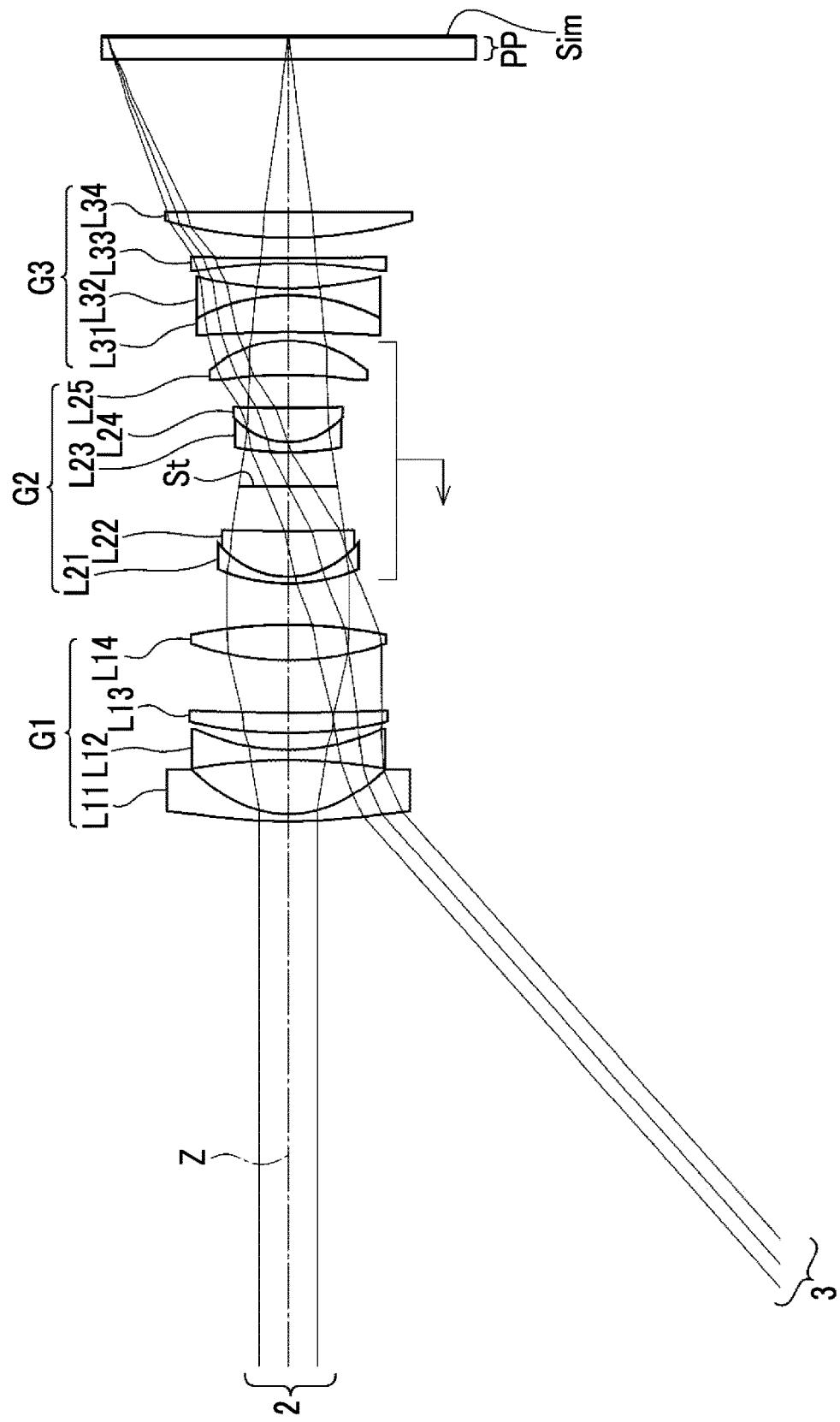
FIG. 13 is a cross-sectional view showing a configuration and optical paths of an imaging lens of Example 5.
Figure 14:
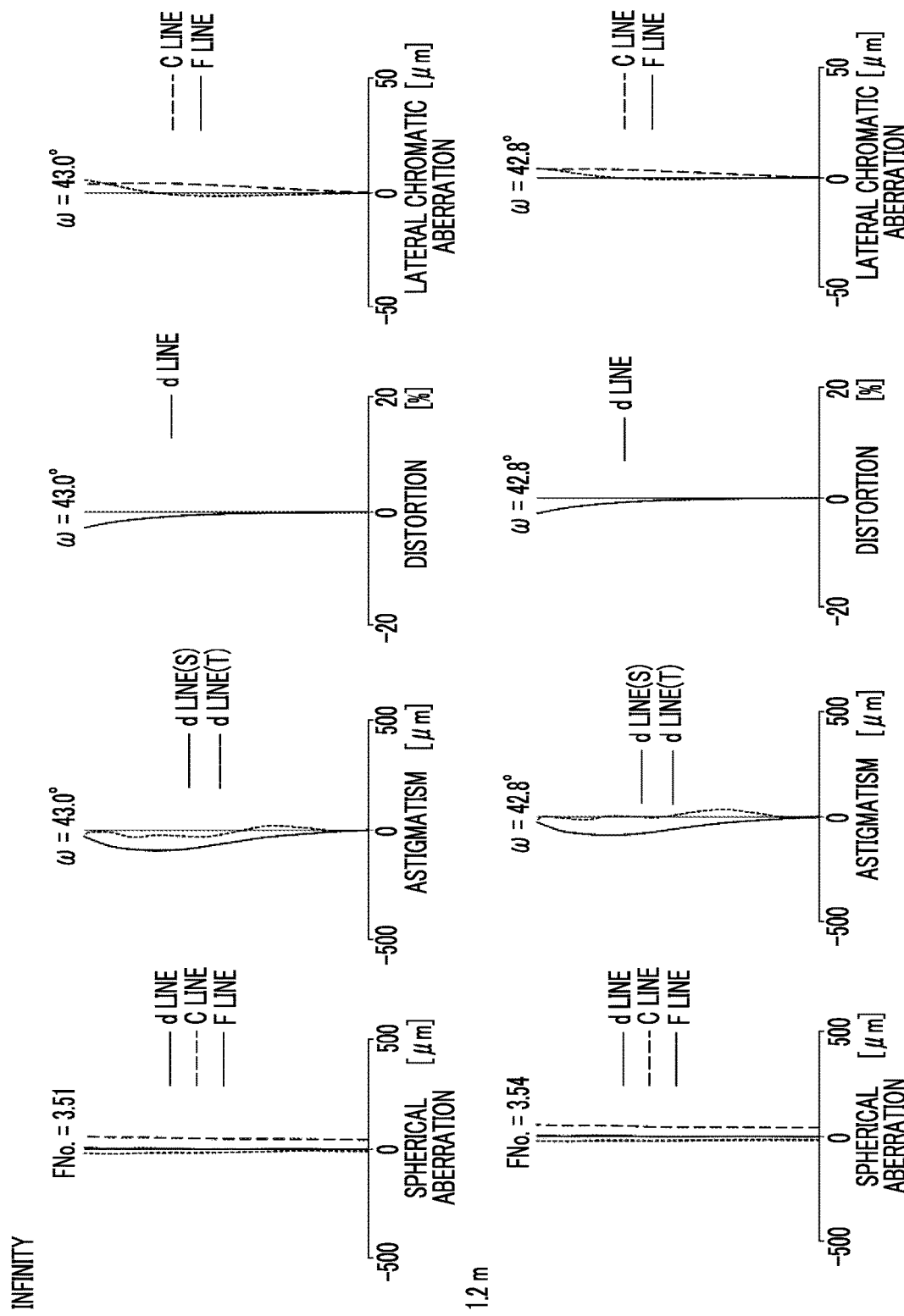
FIG. 14 shows spherical aberration diagrams, astigmatism diagrams, distortion diagrams, lateral chromatic aberration diagrams of the imaging lens of Example 5.
Figure 15:
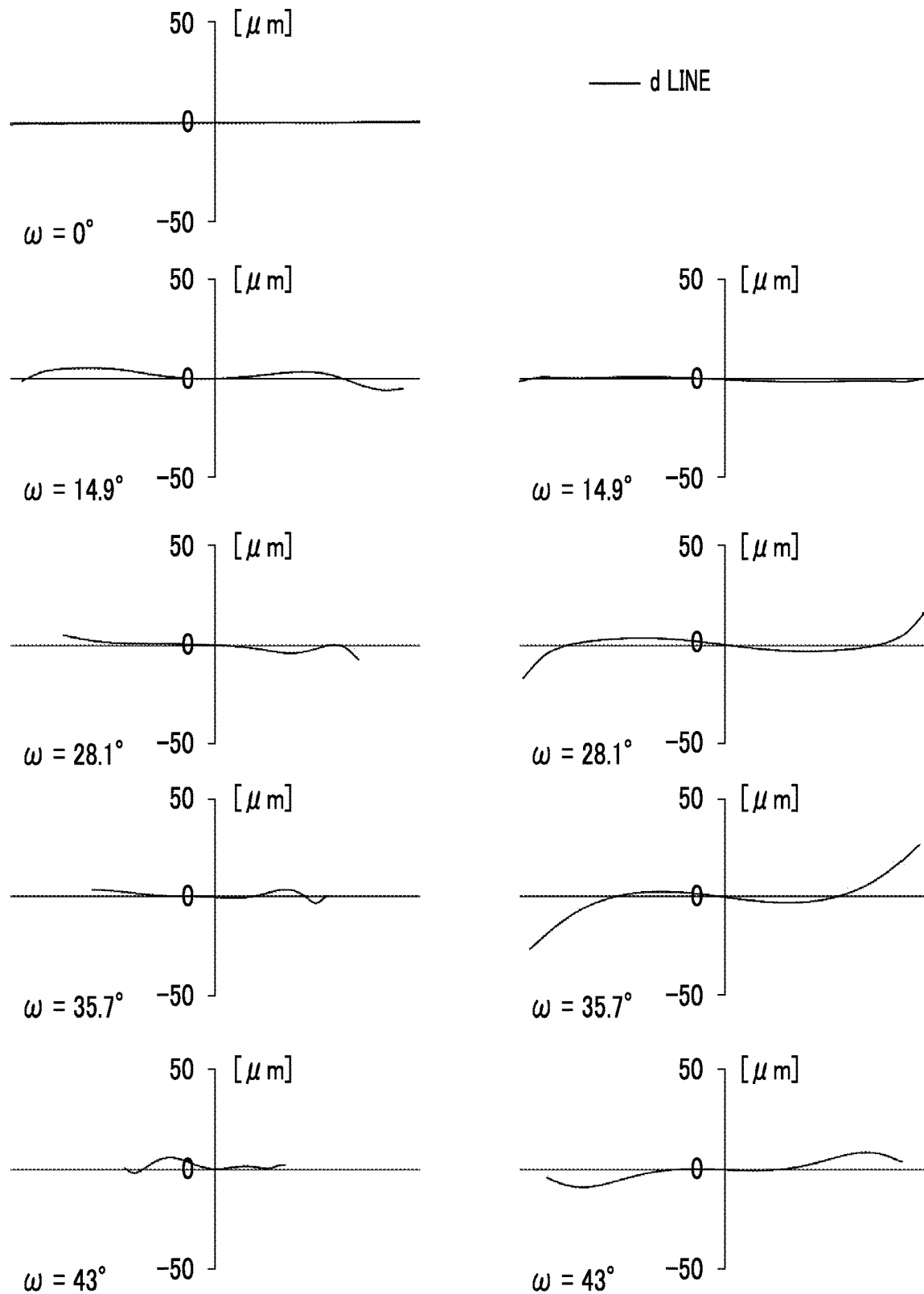
FIG. 15 shows lateral aberration diagrams of the imaging lens according to Example 5.

FIG. 13 is a cross-sectional view showing a configuration of the imaging lens of Example 5. The imaging lens of Example 5 has the same configuration as the outline of the imaging lens of Example 1 except that the first lens group G1 has a negative refractive power as a whole. Regarding the imaging lens of Example 5, Table 13 shows basic lens data, Table 14 shows specification and variable surface distances, and Table 15 shows aspheric surface coefficients. FIG. 14 shows aberration diagrams and FIG. 15 shows lateral aberration diagrams.

TABLE 13

| | Example 5 | | | |
|---|---|---|---|---|
| Sn | R | D | Nd | νd |
| *1 | 81.41749 | 1.050 | 1.81000 | 41.00 |
| *2 | 16.87348 | 7.970 | | |
| 3 | −83.49248 | 1.500 | 1.49700 | 81.59 |
| 4 | 33.70011 | 2.445 | | |
| 5 | 66.56054 | 3.000 | 1.80811 | 22.69 |
| 6 | 315.43341 | 7.680 | | |
| 7 | 45.10867 | 5.225 | 1.69680 | 55.53 |
| 8 | −71.42950 | DD[8] | | |
| 9 | 28.19202 | 1.000 | 1.80166 | 44.28 |
| 10 | 13.80947 | 6.711 | 1.66330 | 59.52 |
| 11 | 303.42858 | 6.511 | | |
| 12(St) | ∞ | 5.000 | | |
| 13 | 46.29398 | 1.500 | 1.90070 | 37.05 |
| 14 | 10.99195 | 5.010 | 1.56907 | 71.31 |
| 15 | 199.24240 | 4.851 | | |
| *16 | −100.50580 | 5.000 | 1.58913 | 61.15 |
| *17 | −19.42692 | DD[17] | | |
| 18 | −198.74315 | 5.417 | 2.00272 | 19.32 |
| 19 | −29.74449 | 1.010 | 1.73800 | 32.33 |
| 20 | 55.43413 | 3.631 | | |
| 21 | −89.84468 | 0.800 | 1.95906 | 17.47 |
| 22 | 491.19263 | 3.002 | | |
| 23 | 70.08481 | 3.709 | 1.73909 | 54.09 |
| 24 | −471043.65325 | 22.826 | | |
| 25 | ∞ | 3.200 | 1.51680 | 64.20 |
| 26 | ∞ | 0.009 | | |

TABLE 14

| | Example 5 | |
|---|---|---|
| | Infinity | 1.2 m |
| f | 30.923 | — |
| FNo. | 3.51 | — |
| 2ω (°) | 86.0 | 85.6 |
| DD[8] | 6.110 | 5.674 |
| DD[17] | 1.241 | 1.677 |

TABLE 15

| | Example 5 | | | |
|---|---|---|---|---|
| Sn | 1 | 2 | 16 | 17 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2281122E−07 | −1.0786505E−05 | −3.7208403E−05 | −1.9193642E−05 |
| A5 | −8.0918552E−07 | −1.0264242E−06 | 2.4918853E−06 | 2.9830437E−06 |
| A6 | 3.0894208E−08 | −1.2603954E−08 | 8.2587863E−08 | −2.4788105E−07 |
| A7 | −1.4949584E−10 | 7.2850530E−10 | −9.7105562E−08 | −5.0818631E−08 |
| A8 | 3.0853454E−11 | −1.9552704E−10 | 1.8355715E−09 | 4.9197427E−09 |
| A9 | −8.0744135E−13 | 1.5982032E−12 | 1.5177218E−09 | 1.3996079E−10 |
| A10 | −3.6267415E−14 | 1.6462503E−13 | 2.6265178E−11 | −6.6449624E−12 |
| A11 | −5.3282930E−15 | −9.2532245E−14 | −1.5302546E−11 | −6.7712184E−13 |
| A12 | −2.4053076E−16 | 1.0128245E−14 | −8.1345029E−13 | −6.1036418E−14 |
| A13 | −2.0985747E−17 | −9.8589728E−16 | 9.2009885E−14 | −2.8389102E−14 |
| A14 | 2.6891746E−18 | 3.6516714E−17 | 2.7738118E−15 | 1.2053373E−15 |
| A15 | 8.5950377E−20 | 2.7693033E−18 | 2.8556468E−16 | 1.9296208E−16 |
| A16 | 8.9705856E−21 | −9.0005895E−19 | −1.8855929E−16 | 3.4420524E−17 |
| A17 | −5.1171638E−22 | 7.4637371E−20 | 3.0916630E−17 | −3.0564156E−18 |
| A18 | −4.8917720E−23 | −2.4287075E−22 | 4.4502685E−20 | −5.2642755E−19 |
| A19 | 1.6388550E−24 | −1.6686214E−22 | −2.8980417E−19 | 5.9877719E−20 |
| A20 | 1.4937497E−26 | 3.6961748E−24 | 1.3587040E−20 | −1.4280268E−21 |

Table 16 shows values corresponding to Conditional Expressions (1) to (13) of the imaging lenses of Examples 1 to 5. In Examples 1 to 5, the d line is used as the reference wavelength, and Table 16 shows the values based on the d line.

TABLE 16

| Expression Number | Conditional Expression | Example 1 | Example 2 | Example 3 | Example 4 | Example 5 |
|---|---|---|---|---|---|---|
| (1) | f2/f1 | 0.209 | 0.011 | −0.004 | 0.026 | −0.035 |
| (2) | \|f3/f2\| | 2.258 | 2.622 | 2.112 | 2.507 | 2.084 |
| (3) | TTL/f1 | 0.460 | 0.023 | −0.009 | 0.052 | −0.072 |
| (4) | fA/f1 | 0.144 | 0.008 | −0.003 | 0.018 | −0.025 |
| (5) | f3/f1 | −0.471 | −0.030 | 0.009 | −0.064 | 0.074 |
| (6) | ν12 − ν3 | 34.57 | 41.33 | 31.79 | 32.50 | 38.61 |
| (7) | $(1-\beta2^2) \times \beta3^2$ | 2.189 | 1.997 | 2.064 | 1.999 | 2.007 |
| (8) | β3 | 1.486 | 1.413 | 1.437 | 1.414 | 1.417 |
| (9) | (R12 − R11)/(R12 + R11) | −0.774 | −0.736 | −0.789 | −0.692 | −0.657 |
| (10) | (R22 + R21)/(R22 − R21) | 0.006 | −0.803 | −0.043 | −0.170 | −0.425 |
| (11) | (Rstr − Rstf)/(Rstr + Rstf) | −0.645 | −0.380 | −0.529 | −0.800 | −0.735 |
| (12) | f2f/f2r | 1.784 | 1.322 | 1.017 | 1.403 | 0.914 |
| (13) | dd/TTL2 | 0.128 | 0.140 | 0.133 | 0.126 | 0.136 |

From the above data, it can be seen that the imaging lenses of Examples 1 to 5 each are configured to satisfy Conditional Expressions (1) to (13), have a small size, have favorable optical performance, and have a wide angle of 70 degrees or more.

Figure 16:
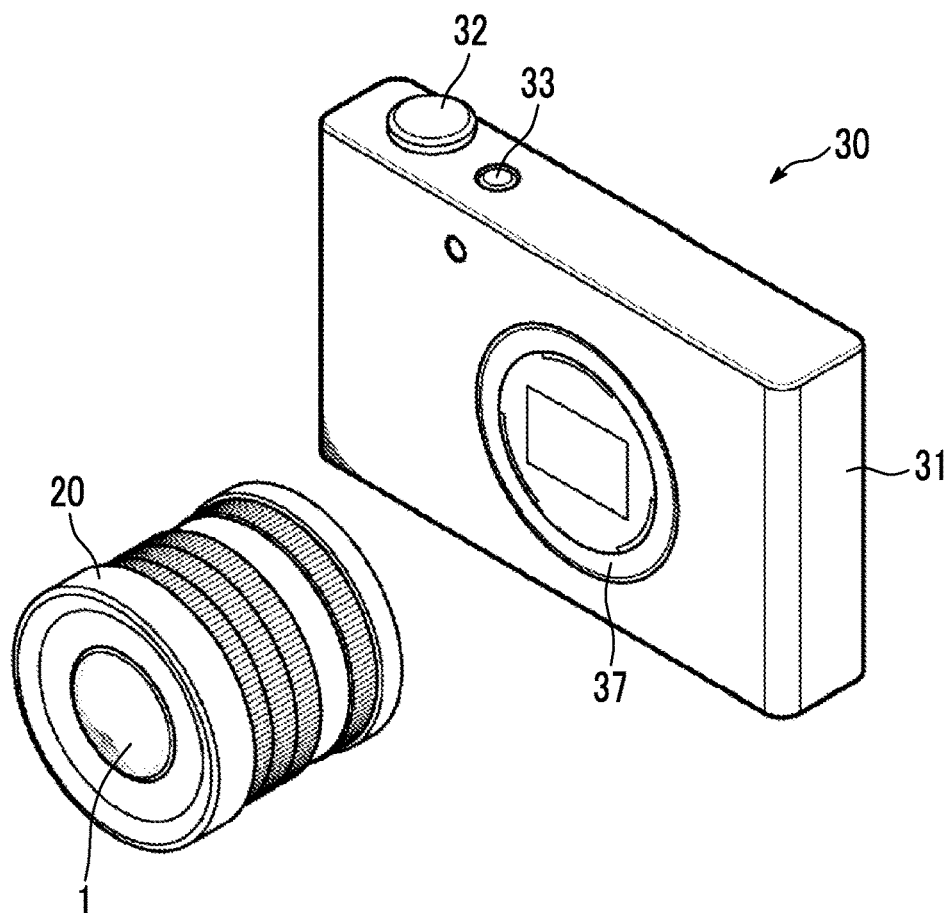
FIG. 16 is a perspective view of the front side of an imaging apparatus according to an embodiment.
Figure 17:
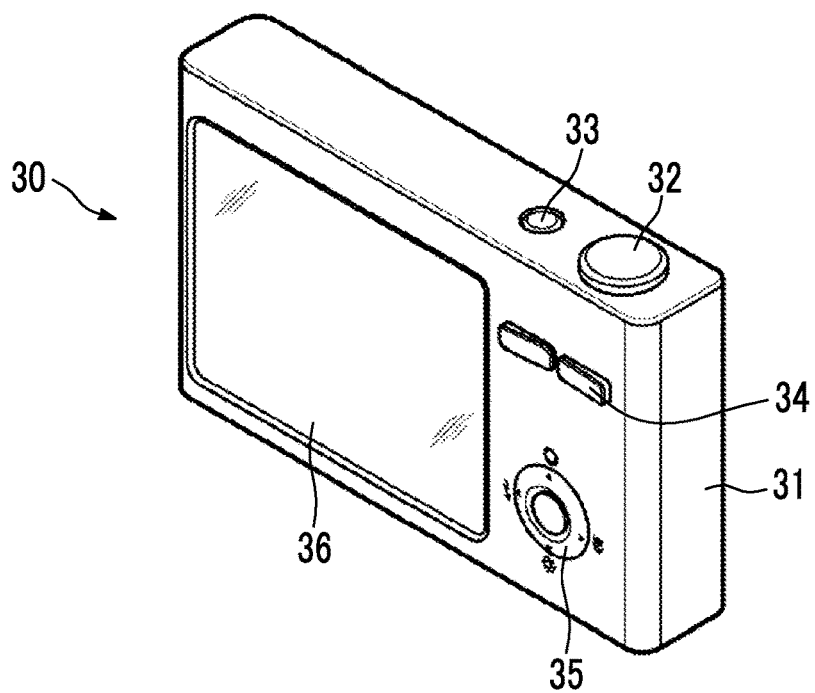
FIG. 17 is a perspective view of the rear side of an imaging apparatus according to an embodiment.

Next, an imaging apparatus according to an embodiment of the present disclosure will be described. FIGS. 16 and 17 are external views of a camera 30 which is the imaging apparatus according to the embodiment of the present disclosure. FIG. 16 is a perspective view of the camera 30 viewed from the front side, and FIG. 17 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens, comprising exactly twelve lenses as lenses, wherein:
    the imaging lens includes, successively in order from a position closest to an object side to an image side:
    a negative meniscus lens convex toward the object side;
    a negative lens concave toward the image side; and
    a meniscus lens convex toward the object side, and
    the imaging lens includes, successively in order from a position closest to the image side to the object side:
    a first positive lens;
    a cemented lens which is formed by cementing a positive lens and a negative lens, in order from the object side;
    a second positive lens; and
    a cemented lens which is formed by cementing a negative lens and a positive lens, in order from the object side.

2. The imaging lens according to claim 1, consisting of, in order from the object side to the image side:
    a first lens group;
    a second lens group; and
    a third lens group,
    wherein, during focusing from an object at infinity to a closest object, the first lens group and the third lens group remain stationary with respect to an image plane, and the second lens group moves along an optical axis.

3. The imaging lens according to claim 2, wherein a lens surface closest to the object side in the second lens group is a convex surface.

4. The imaging lens according to claim 2, wherein a lens surface closest to the image side in the first lens group is a convex surface.

5. The imaging lens according to claim 2, wherein the second lens group includes a positive lens and a negative lens.

6. The imaging lens according to claim 2, wherein the second lens group includes a cemented lens which is formed by cementing a negative lens and a positive lens.

7. The imaging lens according to claim 1, wherein a number of cemented lenses, each of which is formed by cementing a negative lens and a positive lens, in order from the object side, is exactly two.

8. The imaging lens according to claim 1, wherein a number of cemented lenses, each of which is formed by cementing a positive lens and a negative lens, in order from the object side, is exactly one.

9. The imaging lens according to claim 1, including, successively in order from the position closest to the image side to the object side:
the first positive lens;
the cemented lens, which is formed by cementing the positive lens and the negative lens concave toward the image side, in order from the object side;
the second positive lens convex toward the image side; and
the cemented lens, which is formed by cementing the negative meniscus lens convex toward the object side and the positive lens, in order from the object side.

10. The imaging lens according to claim 1, wherein a stop is disposed between a sixth lens and a seventh lens counting from the position closest to the object side.

11. The imaging lens according to claim 1, wherein a stop is disposed adjacent to the object side of a cemented lens which is formed by cementing a negative lens and a positive lens, in order from the object side.

12. The imaging lens according to claim 11, wherein a positive lens is disposed adjacent to the object side of the stop.

13. The imaging lens according to claim 2, wherein assuming that a focal length of the third lens group is f3, Conditional Expression (2) is satisfied:

$$1<|f3/f2|<3 \qquad (2).$$

14. The imaging lens according to claim 1, wherein a refractive index of a lens closest to the object side at a d line is 1.7 or more.

15. The imaging lens according to claim 9, wherein a stop is disposed between a sixth lens and a seventh lens counting from the position closest to the object side.

16. The imaging lens according to claim 9, wherein a stop is disposed adjacent to the object side of a cemented lens which is formed by cementing a negative lens and a positive lens, in order from the object side.

17. The imaging lens according to claim 5, wherein assuming that a focal length of the third lens group is f3, Conditional Expression (2) is satisfied:

$$1<|f3/f2|<3 \qquad (2).$$

18. The imaging lens according to claim 6, wherein assuming that a focal length of the third lens group is f3, Conditional Expression (2) is satisfied:

$$1<|f3/f2|<3 \qquad (2).$$

19. The imaging lens according to claim 9, wherein a refractive index of a lens closest to the object side at a d line is 1.7 or more.

20. An imaging apparatus comprising the imaging lens according to claim 1.

* * * * *